(12) United States Patent
Siminoff

(10) Patent No.: US 12,073,698 B1
(45) Date of Patent: *Aug. 27, 2024

(54) SECURITY DEVICE WITH USER-CONFIGURABLE MOTION DETECTION SETTINGS

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,398

(22) Filed: Nov. 14, 2022

Related U.S. Application Data

(63) Continuation of application No. 16/165,920, filed on Oct. 19, 2018, now Pat. No. 11,501,618.

(51) Int. Cl.
  *G08B 13/196* (2006.01)
  *G06T 7/246* (2017.01)
  (Continued)

(52) U.S. Cl.
  CPC ........ *G08B 13/19602* (2013.01); *G06T 7/246* (2017.01); *H04N 23/51* (2023.01);
  (Continued)

(58) Field of Classification Search
  CPC .............. G08B 13/19602; G06T 7/246; G06T 2207/10016; G06T 2207/10048;
  (Continued)

(56) References Cited

U.S. PATENT DOCUMENTS 4,764,953 A    8/1988 Chern et al.
5,428,388 A    6/1995 von Bauer et al.
(Continued)

FOREIGN PATENT DOCUMENTS

CN    2585521    11/2003
CN    2792061    6/2006
(Continued)

OTHER PUBLICATIONS

Edimax IC-6220DC Wireless Peephole Camera; https://www.youtube.com/watch?reload=9&y=6qGH1XzA_7o, published Nov. 15, 2016.
(Continued)

*Primary Examiner* — Michael Lee
(74) *Attorney, Agent, or Firm* — Lee & Hayes, P.C.

(57) ABSTRACT

A security device has user-configurable motion detection settings. The security device includes at least one camera configured to capture sequential frames of image data within a field of view; at least one processor; memory communicatively coupled with the processor(s); a location setting, stored in the memory, defining whether or not the security device is located at a common access area; and machine readable instructions stored in the memory. The machine readable instructions are executable by the processor(s) to determine the image data indicates motion; and determine that the motion indicates lingering presence at the common access area. In certain embodiments, the machine readable instructions are executable by the processor(s) to determine, from the image data, that the average ambient light over a daily period varies less than a light variation threshold, and configure the location setting to indicate that the security device is located at the common access area.

19 Claims, 14 Drawing Sheets

(51) Int. Cl.
*H04N 23/51* (2023.01)
*H04N 23/661* (2023.01)

(52) U.S. Cl.
CPC ............ *H04N 23/661* (2023.01); *G06T 2207/10016* (2013.01); *G06T 2207/10048* (2013.01); *G06T 2207/30196* (2013.01); *G06T 2207/30232* (2013.01)

(58) Field of Classification Search
CPC ........... G06T 2207/30196; G06T 2207/30232; H04N 23/51; H04N 23/661
See application file for complete search history.

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 9,967,750 B1 | 5/2018 | Fernandez et al. | |
| 10,665,072 B1 | 5/2020 | Fu et al. | |
| 11,501,618 B1 * | 11/2022 | Siminoff | H04N 23/56 |
| 2002/0147982 A1 | 10/2002 | Naidoo et al. | |
| 2003/0043047 A1 | 3/2003 | Braun | |
| 2003/0095185 A1 | 5/2003 | Naifeh | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0156361 A1 | 7/2006 | Wang et al. | |
| 2009/0306408 A1 * | 12/2009 | Yasuhara | C07C 229/50 549/229 |
| 2011/0243378 A1 * | 10/2011 | Lee | H04N 19/20 382/103 |
| 2013/0057695 A1 | 3/2013 | Huisking | |
| 2013/0293718 A1 | 11/2013 | M et al. | |
| 2015/0035987 A1 | 2/2015 | Fernandez | |
| 2015/0102226 A1 | 4/2015 | Monaci et al. | |
| 2015/0130933 A1 | 5/2015 | Breuer et al. | |
| 2015/0228167 A1 * | 8/2015 | Scalisi | G08B 13/19695 340/326 |
| 2015/0235379 A1 * | 8/2015 | O'Gorman | G06T 7/269 382/103 |
| 2017/0075508 A1 | 3/2017 | Borel et al. | |
| 2017/0178345 A1 | 6/2017 | Pham | |
| 2017/0193774 A1 * | 7/2017 | Meganathan | G08B 13/19645 |
| 2017/0254703 A1 | 9/2017 | Purohit et al. | |
| 2017/0309038 A1 | 10/2017 | Dorster et al. | |
| 2018/0232592 A1 | 8/2018 | Stewart et al. | |
| 2018/0357247 A1 | 12/2018 | Siminoff et al. | |
| 2019/0089934 A1 | 3/2019 | Goulden et al. | |
| 2019/0259259 A1 * | 8/2019 | Mullins | G08B 13/1968 |
| 2020/0285841 A1 | 9/2020 | Goulden et al. | |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |

(56) References Cited

FOREIGN PATENT DOCUMENTS

WO    WO2007125143        11/2007
WO    WO-2012074366 A2 *  6/2012   ....... G08B 13/19613

OTHER PUBLICATIONS

Office Action for U.S. Appl. No. 16/165,920, mailed on Mar. 2, 2022, Siminoff, "Security Device with User-Configurable Motion Detection Settings", 11 pages.

* cited by examiner

SECURITY DEVICE WITH USER-CONFIGURABLE MOTION DETECTION SETTINGS

CROSS-REFERENCE TO RELATED APPLICATIONS

This application is a continuation and claims priority to U.S. patent application Ser. No. 16/165,920, filed Oct. 19, 2018, entitled "Security Device with User-Configurable Motion Detection Settings", the entire contents of which are incorporated by reference herein.

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell at the entrance to the home, acts as a powerful deterrent against would-be burglars.

BRIEF DESCRIPTION OF THE DRAWINGS

The various embodiments of the present security device with user-configurable motion detection settings now will be discussed in detail with an emphasis on highlighting the advantageous features. These embodiments depict the novel and non-obvious security device with user-configurable motion detection settings shown in the accompanying drawings, which are for illustrative purposes only. These drawings include the following figures, in which like numerals indicate like parts.

DETAILED DESCRIPTION

Figure 1A:
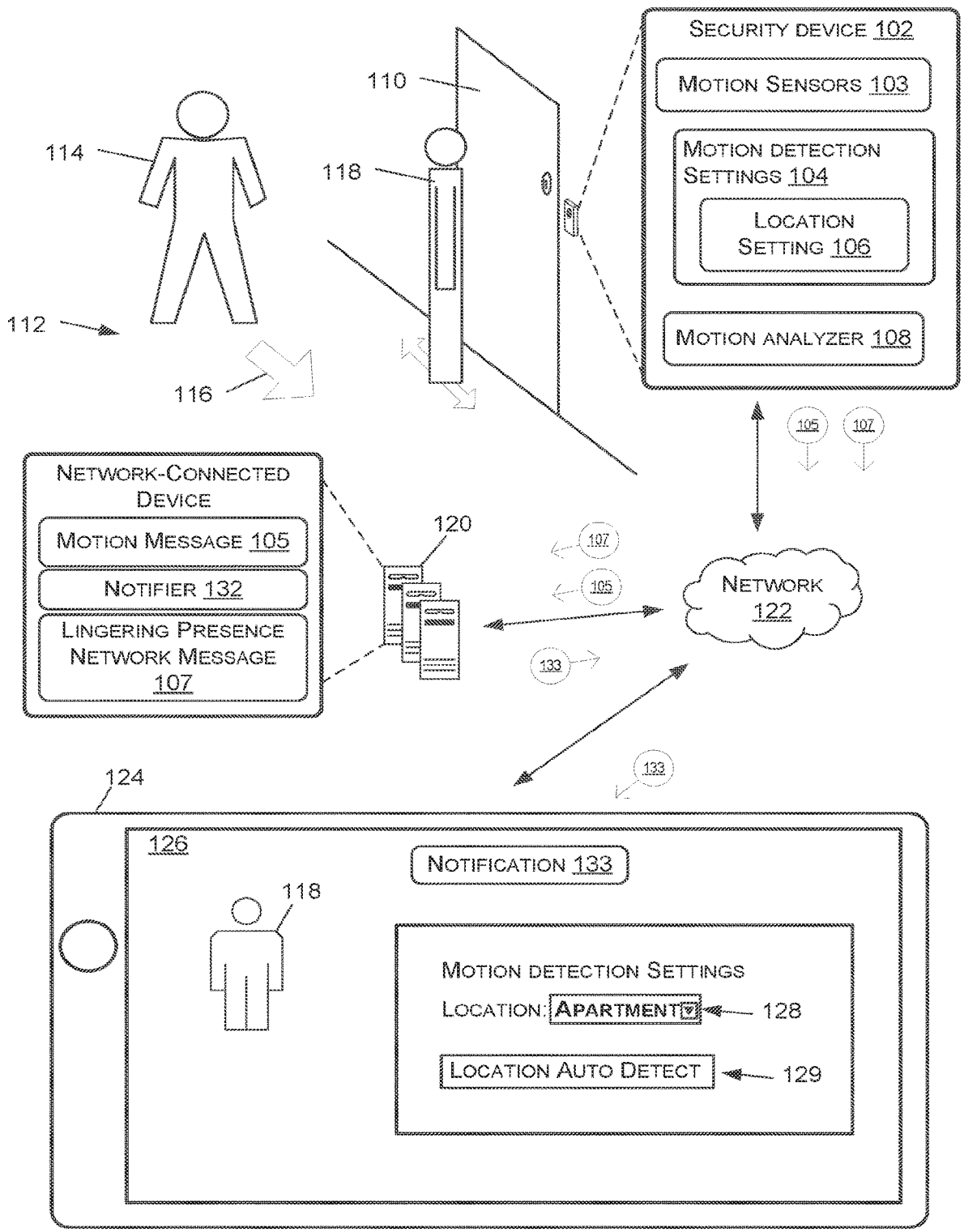
FIG. 1A is a schematic diagram of an example of security device with user-configurable motion detection settings, according to various aspects of the present disclosure.

The various embodiments of the present security device with user-configurable motion detection settings have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

A security device, or other similar device such as a smart doorbell, floodlight camera, and/or security camera, may be used to detect motion of a person approaching a structure (e.g., office, residence), particularly where the person intends to use a door and/or to request attention, such as by ringing the doorbell and/or knocking on the door. Detection of motion near the door is useful for indicating when someone near the door needs attention. Accordingly, when motion near the door is detected, an alert may be generated (e.g., a notification or other such message, sound, and/or other indication) to indicate the needed attention at the door.

For example, the security device may cause a notification to be displayed on a smartphone of an owner or resident of the structure when a person approaches.

One aspect of the present embodiments includes the realization that the security device may be positioned near a common access area, through which persons that may or may not need attention may pass. For example, where the security device is positioned at an apartment door that opens onto a corridor, the security device may detect movement in the corridor of persons passing the apartment door, and that do not need attention. Similarly, the security device may be positioned at a door of a condominium or townhome that faces a shared stairway, where some people using the shared stairway do not need attention. Similarly, the security device may be positioned at a door facing a sidewalk or path where some people using the path do not need attention. Similarly, the security device may be positioned at an office door that opens onto a corridor, where some people using the corridor do not need attention of the office.

When the security device is positioned near the common access area (e.g., one of the corridor, the shared stairway, the shared pathway, etc.), the security device may detect motion of persons passing through the common access area who do not need attention (e.g., persons having no intent of using the door near the security device). Accordingly, the owner may be notified of the detected motion when the person does not require attention and deem the notification a "false alarm." The greater the use of the common access area, the greater the number of false alarms generated, making use of motion detection at such locations impractical for indicating when a person needs attention. The present embodiments solve this problem by including a configuration setting, within the security device or linked server, for example, that may be set to indicate when the security device is positioned near a common access area. When the configuration indicates that the security device is near the common access area, the security device may inhibit notification to the owner when motion is detected, but may process sensor data captured by the security device to determine when there is a lingering presence (e.g., of a person waiting at a door), and may send a notification indicating the lingering presence to the owner.

Advantageously, when configured as being near the common access area, the security device does not generate notifications for persons passing, but does generate notifications when persons are waiting or lingering. Because the security device is configurable, that same security device may advantageously be used near common access areas (e.g., at an apartment door facing a corridor) and may be used in other situations when notification of any detected motion is desirable. Accordingly, the configurable security device is more useful and more versatile than a non-configurable device.

Another aspect of the present embodiments includes the realization that a user may configure the security device incorrectly, resulting in many false notifications when the security device is near the common access area. The present embodiments solve this problem by automatically determining when the security device is positioned near the common access area, based upon one or more sensed conditions, such as ambient light conditions about the security device, where certain sensed conditions are indicative of the security device being near the common access area. Advantageously, by automatically detecting when the security device is near the common access area, the security device (and/or a connected server) may prompt the user to set the configuration for operation of the security device near the common access area, and/or may automatically set the configuration accordingly. Advantageously, such automatic detection and/or configuration of the security device for use near the common access area may prevent the user from becoming dissatisfied with the security device, since many false alarms may be avoided.

A security device, such as a smart doorbell, floodlight camera, and/or security camera, and/or other similar device, may detect motion of persons approaching a structure (e.g., residence, office, retail structure, and so on). The person (e.g., a visitor, a resident, a customer, and so on) may be of interest to an owner of the structure and may intend to request (e.g., by ringing a doorbell and/or knocking on the door) attention of the owner. Accordingly, when the security device detects motion, the security device may generate and send a notification to the owner to indicate that someone is at the structure (e.g., at the door or other entrance) and needs attention. The notification may be an alert or other such message, sound, and/or indication that makes the owner aware someone is approaching or is near the structure. For example, the security device may cause a notification to be displayed on a smartphone of the owner when motion is detected.

In certain situations, the security device may be positioned near a common access area, such as a corridor connecting many apartments, a shared stairway of a condo or townhome, a public sidewalk or path that passes a structure, a hallway that connects offices and/or retail locations, and so on. Some of the persons passing through the common access area may not have any interest or concern for the structure and may not require attention. However, when the security device detects motion of these persons, the security device generates notifications that are not necessarily of interest to the owner, since the persons do not require attention. The owner may consider notifications of persons not requiring attention as "false alarms," and where many such persons pass through the common access area, the false alarms effectively make the use of motion detection at the structure impractical for indicating the presence of a person needing attention to the owner.

To solve this problem, the security device may include a location setting that may be set (e.g., automatically by the security device, automatically by a network-connected device, by the user, and/or by someone configuring the security device) to indicate when the security device is installed near a common access area. When set to indicate proximity to the common access area, the location setting may configure the security device to analyze and categorize sensor data to determine when there is lingering presence of a person near the security device (e.g., a person waiting at a door of the structure configured with the security device). The lingering presence may be indicative of a person requiring attention at the structure (e.g., attention from an owner/resident/worker at the structure). When analysis and/or categorization of the sensor data indicate the lingering presence, the security device may generate and send a notification to the owner. Advantageously, the owner does not receive notification every time motion is detected, but rather only when the lingering presence is detected.

To ensure that the security device is configured correctly, the security device may automatically determine when it is positioned near a common access area, such as when positioned at one of: an apartment door that opens onto a corridor, at a door of a condo or townhome that opens onto a shared stairway, at a door of a structure that opens onto a sidewalk or path, at an office door that opens onto a corridor, an entryway, a gateway, or other such opening. When the security device determines that it is positioned near a common access area, the security device (and/or a network-connected device linked to the security device) may interact with the owner (or with an authorized person) to suggest the correct configuration, or may automatically configure itself for operation at the common access area. Thus, the security device is correctly configured and the owner does not receive false alarms of persons needing attention.

The remaining detailed description describes the present embodiments with reference to the drawings. In the drawings, reference numbers label elements of the present embodiments. These reference numbers are reproduced below in connection with the discussion of the corresponding drawing features.

FIG. 1A is a schematic diagram of a security device 102 with user-configurable motion detection settings 104, according to various aspects of the present disclosure. In the example of FIG. 1A, the security device 102 is installed at an apartment door 110 that is proximate a common access area 112 (e.g., a corridor providing access to multiple apartments, including into apartment door 110). The security device 102 allows an owner of the apartment (and/or a resident or authorized user of the apartment and security device) to receive a notification 133 indicative of movement detected by the security device 102 at the apartment door 110. Although shown positioned adjacent to the apartment door 110, the security device 102 may instead be configured with a peephole aperture of the apartment door 110, may be positioned on the apartment door 110, and/or may be positioned elsewhere to monitor the common access area 112 near the apartment door 110.

The security device 102 may include one or more motion sensors 103 that operate to detect motion about the apartment door 110. For example, as a first person 114 moves (indicated by arrow 116) through the common access area 112, the motion sensors 103 may detect motion of the first person 114 near the apartment door 110. In response to detecting motion, the security device 102 may send a motion message 105 to a network-connected device 120 via a network 122. The network-connected device 120 may represent one or more of a server, a backend server, a smart home hub, and so on, that is connected to the network 122. A notifier 132 of the network-connected device 120, in response to receiving the motion message 105, may generate and send a notification 133 to a client device 124 of the owner of the apartment, and the client device 124 may display the notification 133 on a display 126 of the client device 124. Accordingly, the owner may be notified of any movement near the apartment door 110. As described below in more detail, the security device 102 may also facilitate communication between the client device 124 and a person at the apartment door, wherein a video of the person may be shown on the display 126 and/or recorded by the network-connected device 120.

However, since the common access area 112 may be used by many persons (e.g., neighbors passing by the apartment door 110) that are not of interest to the owner, the notifications 133 for any movement past the apartment door 110 may become an annoyance to the owner, and the owner may disable the notifications, or ignore them altogether. Accordingly, when a visitor is waiting for attention at the apartment door, the visitor may also be ignored or missed by the owner.

To solve this problem, the security device 102 and/or the network-connected device 120 may include a location setting 106 that is user-configurable to indicate that the security device 102 is installed near an area of common access (e.g., the common access area 112). For example, the location setting 106 may be set to an "apartment mode" to indicate that the security device 102 is monitoring a common access area. Although the term "apartment mode" is used herein, the common access area 112 is not limited to being a corridor near an apartment door. For example, the location setting 106 may be set to the "apartment mode" when the corresponding common access area is one of an alleyway between houses, a sidewalk in front of a house, a corridor between offices, a pathway between houses, and so on.

When the location setting 106 is set to "apartment mode," the owner may not be immediately notified of motion detected by the security device 102. Rather, when in "apartment mode," the security device 102 may inhibit motion notifications, and may invoke a motion analyzer 108 to detect a lingering presence at the security device 102. When the lingering presence is detected, the motion analyzer 108 may send a lingering presence network message 107 to the network-connected device 120 via the network 122. The notifier 132, upon receiving the lingering presence network message 107, may generate the notification 133 indicative of the lingering presence at the apartment door.

In certain embodiments, the owner may interact with the client device 124, using a selection dialog 128 for example, to set the location setting 106 to "apartment mode." In other embodiments, the owner may activate a location auto detect button 129 (or other such interactive control) on the display 126 of the client device 124 to initiate automatic configuration of the location setting 106, as described below.

Figure 1B:
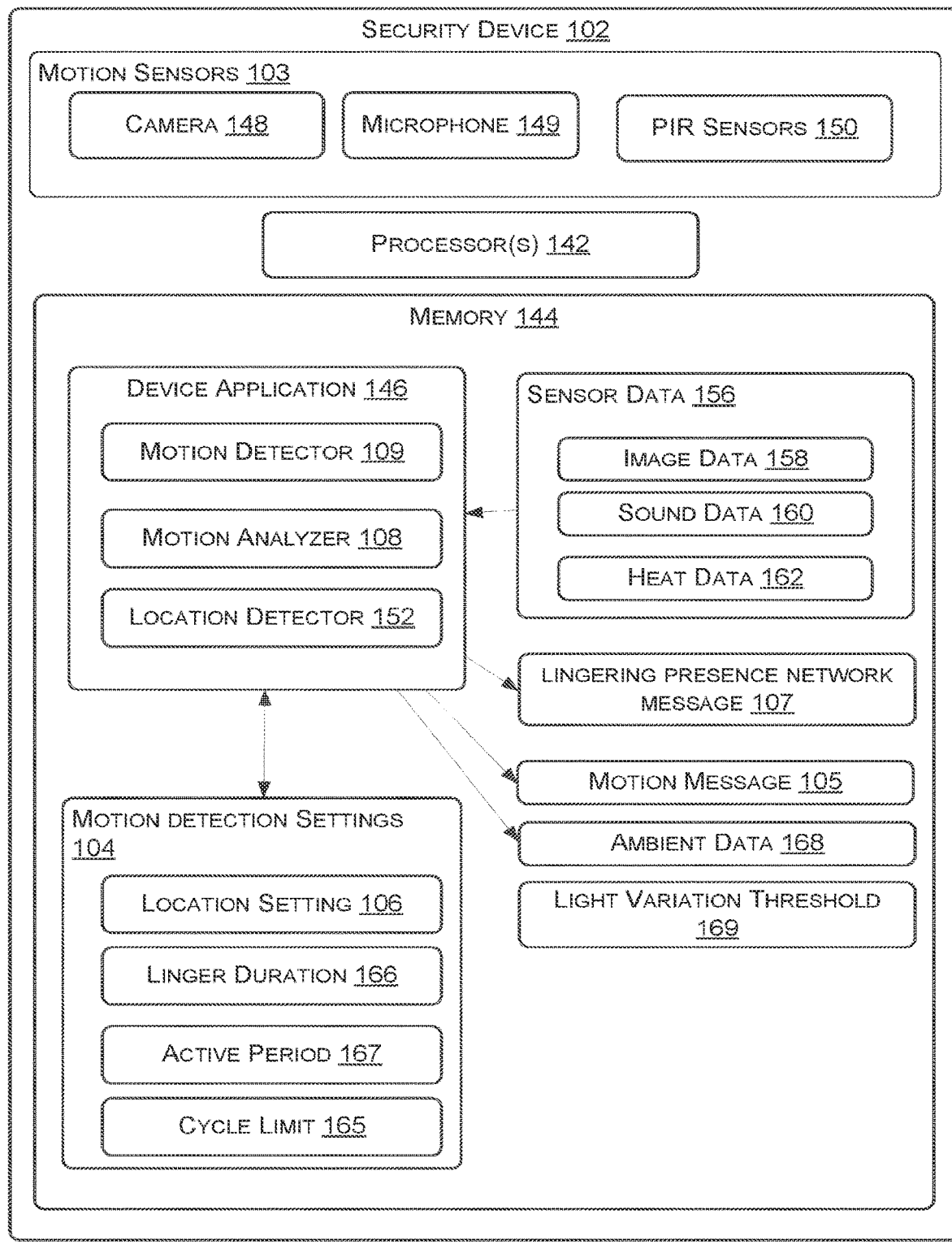
FIG. 1B is a block diagram illustrating the security device of FIG. 1A in further example detail, according to various aspects of the present disclosure.

FIG. 1B is a block diagram illustrating the security device of FIG. 1A in further example detail. FIGS. 1A and 1B are best viewed together with the following description. The security device 102 may include at least one processor 142 and a memory 144 storing a device application 146 (e.g., software and/or firmware), implemented as machine readable instructions that, when executed by the at least one processor 142, control the at least one processor 142 to implement the functionality of the security device 102 as described herein. The at least one processor 142 may include any processor, such as a central processing unit (CPU), a microprocessor, an application-specific integrated circuit (ASIC), an ARM processor (a processor based on the RISC (reduced instruction set computer) architecture developed by Advanced RISC Machines (ARM)), a controller, a microcontroller, etc. In certain embodiments, the at least one processor 142 may comprise multiple processors, and may include one or more other processors, such as one or more microprocessors, and/or one or more supplementary co-processors, such as math co-processors.

The security device 102 may include at least one camera 148, and/or at least one microphone 149, and/or at least two passive infrared (PIR) sensors 150. One or more of the camera 148, the microphone 149, and the PIR sensors 150 may form (or operate as) the motion sensors 103 for detecting motion near the security device 102. In certain embodiments, the at least one camera 148 may be configured with a field of view that has a line of sight extending perpendicularly away from the apartment door 110. In certain embodiments, the field of view of the camera 148 may be through an aperture (e.g., a cylindrical peephole) in the apartment door 110. In certain embodiments, the camera 148 may be configured within a housing that fits within the aperture of the apartment door 110, and is operable as a peephole camera. The microphone 149 may be positioned to sense sounds in an area near the apartment door 110—for example sounds at the common access area 112—and in certain embodiments this area may at least in part overlap with the field of view of the camera 148. In certain embodiments, the microphone 149 may be positioned to sense sounds from the area through the aperture in the apartment door. A first one of the at least two PIR sensors 150 may have a first field of view and a second one of the PIR sensors 150 may have a second field of view, where the first and second ones of the PIR sensors 150 are configured to capture heat data 162 from the first and second fields of view, respectively. In certain embodiments, the first and second fields of view of the PIR sensors 150 may have a line of sight through the aperture in the apartment door 110 and at least partially overlap with the field of view of the camera 148.

The motion sensors 103 operate to capture sensor data 156 of the environment around the security device 102. The sensor data 156 may be stored in the memory 144 and may include one or more of image data 158 captured by the camera 148, sound data 160 captured by the microphone 149, and heat data 162 captured by the PIR sensors 150. A motion detector 109, implemented within the device application 146 as machine readable instructions executable by the at least one processor 142, may process one or more of the image data 158, the sound data 160, and/or the heat data 162, to detect motion near the apartment door 110. In certain embodiments, the motion detector 109 may process the sensor data 156 as it is received from the motion sensors 103.

When motion is detected by the motion sensors 103 (e.g., when one or more of the camera 148, the microphone 149, and the PIR sensors 150 detect activity about the security device 102), and the location setting 106 is set to the "apartment mode," the motion analyzer 108 may be invoked to process the sensor data 156 (e.g., one or more of the image data 158, the sound data 160, and the heat data 162) to determine whether there is a lingering presence about the security device 102. The motion analyzer 108 may, for example, include algorithms (described below) that process the image data 158 to detect whether captured video includes movement of a human and whether the human remains within the field of view of the camera 148 for at least a linger duration 166, which may be defined within the motion detection settings 104 stored in the memory 144. In various embodiments, the linger duration 166 may have a value between about three seconds and about ten seconds. The value of the linger duration 166 may be preprogrammed for the security device 102, or may be configurable by the owner. For example, the owner may use the client device 124 to interactively configure the value of the linger duration 166.

The motion detection settings 104 may also define one or more active periods 167 that define when the lingering presence may be detected. The motion detection settings 104 may be user-configurable, and the owner may interact with the client device 124 to define one or more of the location setting 106, the linger duration 166, and the active period 167. For example, the owner may use the client device 124 to interactively configure the active period 167 as 9:00 AM-5:00 PM, Monday to Friday, since this period is a time when the owner is away from the apartment and wishes to be notified when someone is waiting at the apartment door 110.

The motion analyzer 108 may also include algorithms to determine whether the human is making back-and-forth movements that may represent the lingering presence at the apartment door 110. For example, the algorithms may calculate an elapsed time that a person 118 paces at the apartment door 110, and when this elapsed time exceeds the linger duration 166, the person 118 is considered to have the lingering presence at the apartment door 110. The linger duration 166 (e.g., a predefined or configurable measure of time) is the minimum duration that the person 118 remains at the apartment door 110 to be considered a lingering presence. For example, the first person 114 moving along the common access area 112 and past the apartment door 110 does not wait at the apartment door, and is therefore not detected as a lingering presence by the motion analyzer 108. On the other hand, when the second person 118 (e.g., a visitor) waits for at least the linger duration 166 at the apartment door 110, the motion analyzer 108 may determine that the second person 118 is lingering and therefore sends a lingering presence network message 107 to the network-connected device 120. Accordingly, the owner receives the notification 133 when the second person 118 lingers at the apartment door 110, but does not receive the notification 133 when the first person 114 moves through the common access area 112 near the apartment door 110. Advantageously, the owner is not disturbed by notification of persons passing through the common access area 112 near the apartment door 110, but receives notifications 133 when the second person 118 is waiting at the apartment door 110.

Image Analysis

In certain embodiments, the camera 148 may be used to detect motion within the area about the security device 102 (e.g., in the common access area 112 about the apartment door 110). For example, the motion detector 109 may determine when a certain percentage of pixels change values in a designated area of successive frames of the image data 158 captured by the camera 148, indicating movement within a corresponding area about the security device 102. The designated area may include the entire frame, or may be defined by the owner (or other authorized person) to exclude areas where motion is to be ignored.

When the motion detector 109 detects motion and the location setting 106 is set to "apartment mode," the device application 146 may invoke the motion analyzer 108 to process the image data 158 to determine whether there is a lingering presence at the apartment door 110. In one example, the motion analyzer 108 may process the image data 158 to determine whether there is a person lingering at the apartment door 110. Using the example of FIG. 1A, in certain embodiments the motion analyzer 108 may identify a lingering presence when the same person (e.g., the second person 118) appears in consecutive frames of the image data 158 for at least the linger duration 166, indicating that the second person 118 remains within a field of view of the camera 148 and thus near the apartment door 110. Where the linger duration 166 has a value of five seconds, when the motion analyzer 108 detects the same person in consecutive frames of the image data 158 over a five second duration, the motion analyzer 108 may determine that the person represents a lingering presence at the apartment door 110. However, when any one person does not remain within consecutive frames of the image data 158 for the linger duration 166, no lingering presence is detected. That is, a person (e.g., the first person 114) appearing within a sequence of frames with a duration less than the linger duration 166 does not represent a lingering presence. Thus, a continuous stream of different people moving through the common access area 112, passing the apartment door 110, and appearing within frames of the image data 158 are not detected as a lingering presence.

Sound Analysis

The motion analyzer 108 may also include algorithms that analyze the sound data 160 to detect the lingering presence at the apartment door 110. The sound data 160 may include a digital representation of sounds detected by the microphone 149, and accordingly represents sounds around the area of the security device 102 (e.g., sounds at the apartment door 110 and/or from the common access area 112). The motion analyzer 108 may include one or more algorithms for processing the digital representation of sounds to detect lingering presence of a person near the security device 102 (e.g., at the apartment door 110). For example, the motion analyzer 108 may detect the sounds of feet pacing and/or shuffling near the apartment door 110, and where these sounds prevail for a duration equal to or greater than the linger duration 166 the motion analyzer 108 may determine that the sounds are indicative of a lingering presence.

Heat Data Analysis

The motion analyzer 108 may also include algorithms that analyze the heat data 162 to detect a lingering presence at the apartment door 110. For example, FIG. 1F is a plan view of a first PIR sensor 150(1) with a first field of view 151(1) and a second PIR sensor 150(2) with a second field of view 151(2), from the apartment door 110, where the first and second fields of view 151(1), 151(2) partially overlap (as shown by arrow 155). Each of the fields of view 151(1), 151(2) may include multiple detection zones in which the corresponding PIR sensor 150 detects motion. For example, as the person 118 moves within the first field of view 151(1), the first PIR sensor 150(1) may generate, based upon changes in infrared radiation impinging on its detector from the first field of view 151(1), heat data 162 indicative of that detected movement. Similarly, as the person 118 moves within the second field of view 151(2), the second PIR sensor 150(2) may generate, based upon changes in infrared radiation impinging on its detector from the second field of view 151(2), heat data 162 indicative of that detected movement. Since the fields of view 151(1), 151(2) only partially overlap, the heat data 162 may indicate when the person 118 paces, shuffles, or otherwise moves cyclically in front of the apartment door 110.

Accordingly, the heat data 162 may include indications of movement of the person 118, indicated by arrow 153, in front of the apartment door 110, and the motion analyzer 108 may use algorithms to analyze the heat data 162 to determine whether there is a lingering presence at the apartment door 110. Particularly, the use of at least two PIR sensors 150 allows the algorithms to discern between the person 114 passing by the apartment door 110 and the person 118 waiting at the apartment door 110.

Cyclical Movement Analysis

The algorithms within the motion analyzer 108 may also detect cyclic patterns in the sensor data 156. For example, when analysis of the sound data 160 indicates a repeating cyclic pattern, such as may occur when the second person 118 paces in front of the apartment door 110, with a duration equal to or greater than the linger duration 166, the motion analyzer 108 may determine that the person 118 is pacing or shuffling before the apartment door 110, thereby indicating a lingering presence. In another example, when analysis of the heat data 162 includes the first and second fields of view 151(1), 151(2) repeatedly and alternatively indicating motion with a duration equal to or greater than the linger duration 166, the motion analyzer 108 may determine that a person is pacing before the apartment door 110, thereby indicating a lingering presence. For example, the motion analyzer 108 may determine a period of the cyclical movement, and compare the period to a cycle limit 165 stored within the motion detection settings 104 (e.g., within the memory 144). Particularly, the cycle limit 165 may be sufficiently short to prevent multiple persons (e.g., the person 114) walking past the apartment door 110 from appearing as a lingering presence. In another example, analysis of the image data 158 of the camera 148 may indicate cyclical movements within the field of view and, thereby, lingering presence at the apartment door 110.

In certain embodiments, the motion analyzer 108, when the cyclical movement is detected, may send, via the network 122, a cyclical movement network message (e.g., as the motion message 105) to the network-connected device 120 linked with the security device 102. Accordingly, the network-connected device 120 may send the notification 133 to the client device 124 to indicate that the cyclical movement has been detected. In certain embodiments, the network-connected device 120 may send a command to the security device 102 to enable detection of the cyclical movement.

Combined Analysis

In certain embodiments, the motion analyzer 108 may process two or more of the image data 158, the sound data 160, and the heat data 162 to determine whether there is a lingering presence at the apartment door 110. For example, in embodiments where the security device 102 includes both the camera 148 and the microphone 149, when the motion analyzer 108 determines that the sound data 160 indicates a lingering presence at the apartment door 110, the motion analyzer 108 may also evaluate the image data 158 to determine whether there is a person at the door.

Automatically Detecting Location

Where an apartment door (e.g., apartment door 110) opens onto a corridor within the apartment building, that corridor is often without external windows and is therefore continuously illuminated using artificial lighting (e.g., electric illumination), and the level of illumination in the corridor varies little through the day. In certain embodiments, the security device 102 may include a location detector 152 that processes ambient data 168, sensed about the security device 102, to determine whether it is positioned in such a corridor. For example, the location detector 152 may, at least periodically through a detection period (e.g., one day), sense the level of ambient light at the security device 102 and store it as the ambient data 168, by using the camera 148 and/or a light sensor configured with the security device 102. At the end of the detection period, the location detector 152 may determine whether average the ambient light over the detection period varies less than a light variation threshold 169 described below.

In one embodiment, the location detector 152 may be automatically invoked at, or shortly after, installation of the security device 102 to collect the ambient data 168. In another embodiment, the owner may interact with the display 126 of the client device 124 to activate an auto detect button 129 (e.g., a selectable button) that causes the client device 124 to send a command to the security device 102, which in turn causes the device application 146 to invoke the location detector 152 to collect the ambient data 168. In other embodiments, the location detector 152 may always sample (e.g., periodically) and store (e.g., in a cyclic buffer) the ambient conditions as the ambient data 168, wherein, when invoked to determine the current location of the security device 102, the location detector 152 processes the already recorded ambient data 168 to determine the location setting 106.

When the average ambient light level varies less than the light variation threshold 169, the location detector 152 may automatically configure the location setting 106 to indicate that the security device 102 is located at a doorway of an apartment by setting the location setting 106 to "apartment mode." The light variation threshold 169 is, for example, based upon a minimum expected variation in average light levels over a period of one day at a current latitude and time of year (e.g., that includes a transition between daylight and night).

In certain embodiments, the device application 146 may periodically (or aperiodically) invoke the location detector 152 to evaluate the location of the security device 102 in view of the location setting 106; where the location setting 106 does not match the determined location, the location detector 152 and/or the device application 146 may initiate a dialog with the owner via the client device 124 to validate/verify the location setting 106.

Too Many Motion Notifications

In certain embodiments, the location detector 152 may evaluate indications of detected motion (e.g., generated notifications 133) over a period of at least one day, to determine whether the notifications indicate a common access area being near the security device 102. For example, where the number of motion notifications is high, this may indicate that the security device 102 faces the common access are 112, and thereby generates motion notifications that may not be of interest to the owner. The location detector 152 may further determine when (e.g., a time of day) the notifications occur, which also may be indicative of the security device 102 facing the common access area 112. For example, where most of the motion notifications occur between 7 AM and 9 AM and between 4 PM and 6 PM, this may be caused by neighbors leaving for and returning from work and/or school. Thus, in these situations, the location detector 152 may determine that the security device 102 faces the common access area 112.

When the owner becomes annoyed by too many motion notifications, the owner may disable notifications altogether through the client device 124. Accordingly, the location detector 152 may also detect when the owner disables the notifications, and may then assume that the security device may face the common access area 112; it may then evaluate the ambient light levels as described above to determine whether the location setting 106 should be changed to the apartment mode and/or whether the location detector 152 should initiate an interaction with the owner, via the client device 124, to ask whether the location setting 106 should be set to apartment mode.

Interactive Configuration

Figure 1C:
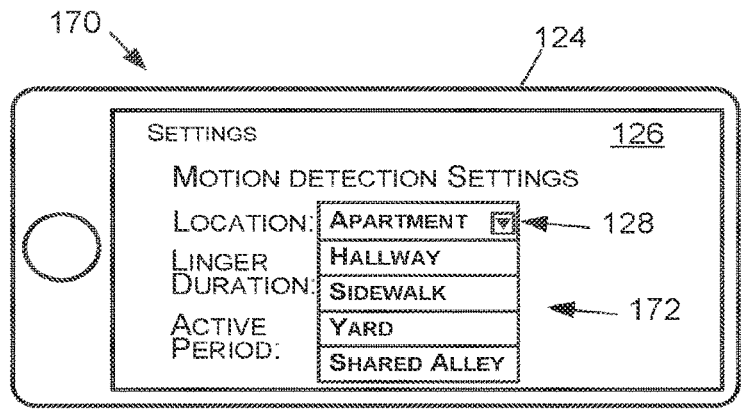
FIG. 1C is a schematic diagram showing one example motion detection configuration screen on the display of the client device of FIG. 1A, according to various aspects of the present disclosure.

FIG. 1C is a schematic diagram showing one example motion detection configuration screen 170 on the display 126 of the client device 124. In certain embodiments, an installer (e.g., the owner) may interact with the client device 124 to configure the security device 102. When configured to communicate with the network 122, the security device 102 may communicate with the network-connected device 120, and/or the client device 124 via the network 122. The security device 102 may interact, via the network-connected device 120 and/or the network 122 for example, with the client device 124 to display the motion detection configuration screen 170. In other embodiments, the network-connected device 120 may interact, via the network-connected device 120 and/or the network 122, with the client device 124 to display the motion detection configuration screen 170.

The motion detection configuration screen 170 may include the selection dialog 128 that allows the owner to select from a list 172 of locations, including, for example, "apartment," "hallway," "sidewalk," "yard," and "shared alley." The list 172 may include other locations, and may be a scrollable list. In embodiments, the location setting 106 is set based upon a selected one of the locations from the list 172 that define the motion detection settings 104 used during operation of the security device 102. In certain embodiments, two or more of the locations may have similar motion detection settings. For example, "apartment," "hallway," "sidewalk," and "shared alley" may result in the location setting 106 being set to "apartment mode."

Figure 1D:
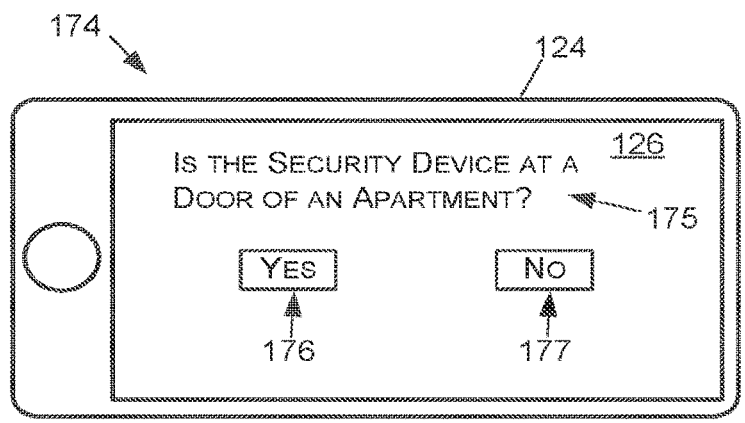
FIG. 1D is a schematic diagram showing one example interactive screen on the display of the client device of FIG. 1A, according to various aspects of the present disclosure.

FIG. 1D is a schematic diagram showing one example interactive screen 174 on the display 126 of the client device 124. The location detector 152 may, via the network-connected device 120 and/or the network 122 for example, control the client device 124 to display the interactive screen 174 when the ambient data 168 indicates that the security device 102 is installed near the common access area 112. For example, when the location setting 106 is not set to "apartment mode," the location detector 152 may analyze the ambient data 168 and determine that the level of average ambient light detected by the camera 148 does not vary significantly over a period of a day. The location detector 152 may further analyze the ambient data 168 and determine that the level of average ambient light detected by the camera 148 does not vary significantly while lights illuminate the common access area 112, taking into account lights that may be switched on or off manually or via timers. The location detector 152 may then notify the network-connected device 120, which in response, initiates interaction with the owner via the client device 124.

In particular, when initiated by the location detector 152, the client device 124 may display the interactive screen 174 with a question 175, asking whether the security device 102 is positioned at a door of an apartment, for example. The interactive screen 174 may provide a yes button 176 and a no button 177, or other interactive control, for the owner to respond to the question. When the owner selects one of the buttons 176, 177, a device application (e.g., device application 614 of FIG. 6) of the client device 124 may send the selected response, via the network-connected device 120 and/or the network 122, to the location detector 152. In response to selection of the yes button 176, the location detector 152 may set the location setting 106 to "apartment mode," thereby configuring the device application 146 to inhibit notification of detected motion and invoke the motion analyzer 108 to determine whether there is a lingering presence at the apartment door 110. Accordingly, the owner may be notified when a lingering presence is detected at the apartment door 110, and not merely detected motion that is not lingering. In certain embodiments, the network-connected device 120 may receive the indication of the owner selecting the yes button 176, and may generate and send the motion detection settings 104 to the security device 102.

When the user selects the no button 177 on the interactive screen 174, the location detector 152 (or the network-connected device 120), the location setting 106 remains unchanged.

Figure 1E:
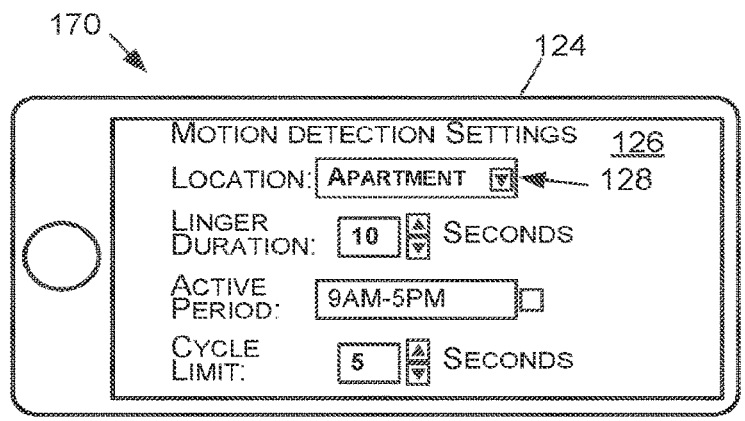
FIG. 1E is a schematic diagram showing another motion detection configuration screen on the display of the client device of FIG. 1A, according to various aspects of the present disclosure.
Figure 1F:
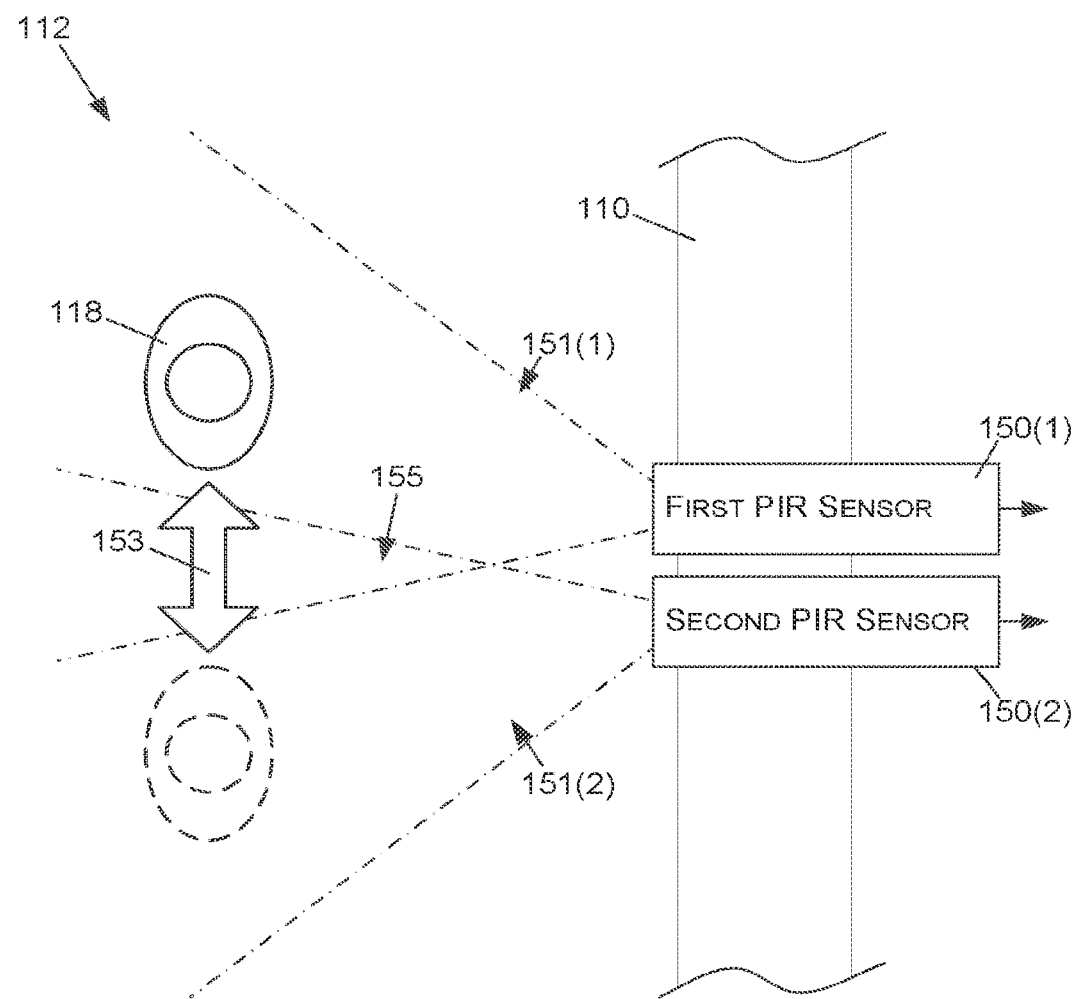
FIG. 1F is a plan view of a first PIR sensor with a first field of view and a second PLR sensor with a second field of view, positioned at the apartment door of FIG. 1A, where the first and second fields of view partially overlap, according to various aspects of the present disclosure.

FIG. 1E is a schematic diagram showing the example motion detection configuration screen 170 of FIG. 1C in further example detail. Particularly, the motion detection configuration screen 170 allows the owner to configure the linger duration 166, the active period 167, and the cycle limit 165. Accordingly, the motion detection settings 104 may be manually and interactively configured by the owner using the client device 124.

Network-Connected Device Implementation

Figure 5:
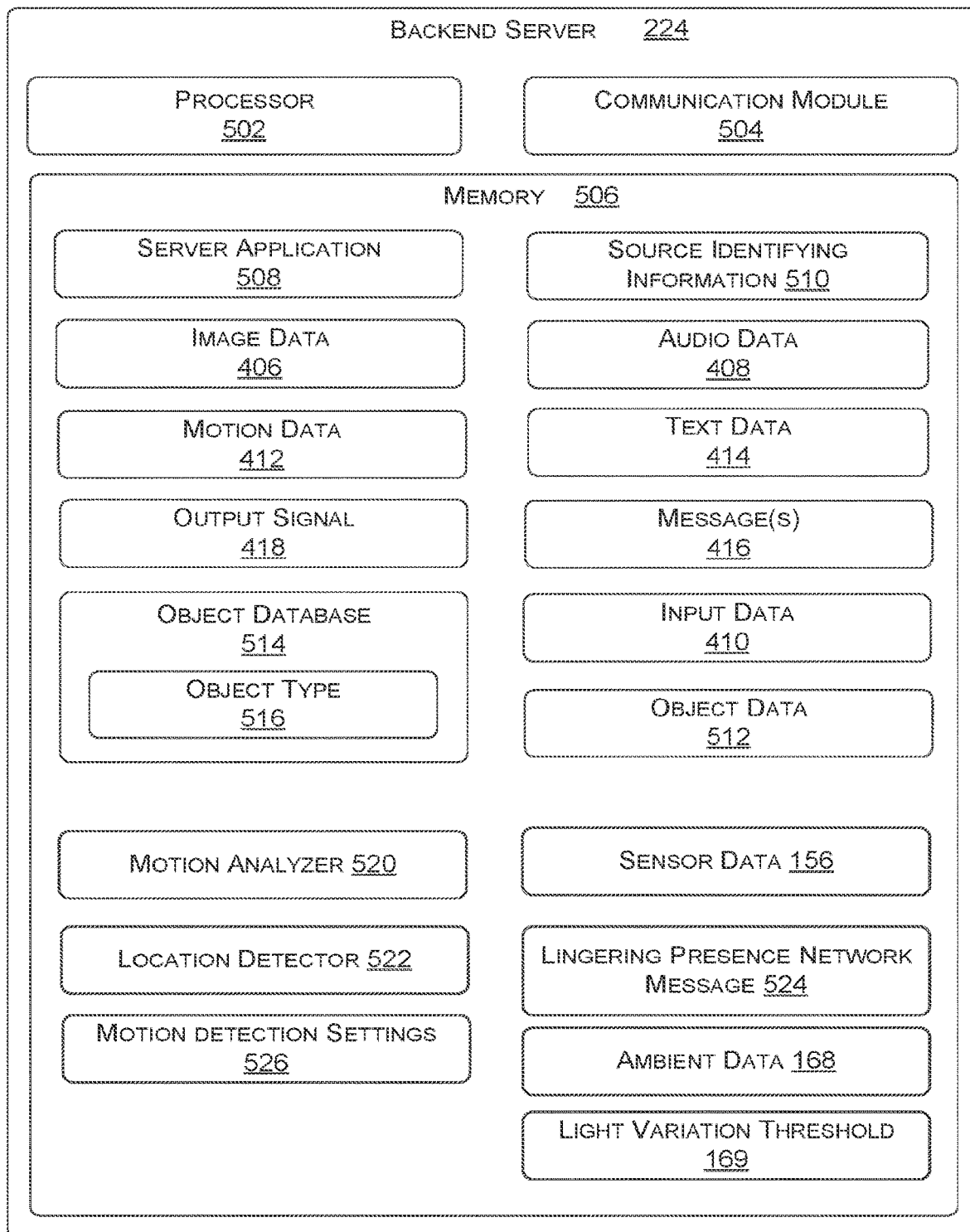
FIG. 5 is a functional block diagram illustrating one example embodiment of a backend device according to various aspects of the present disclosure.

In certain embodiments, at least some of the functionality of the motion analyzer 108 and the location detector 152 may be implemented within the network-connected device 120. See for example FIG. 5 showing a backend server 224, which may represent the network-connected device 120, with a motion analyzer 520, a location detector 522, and motion detection settings 526. The network-connected device 120 may receive at least part of the sensor data 156 and/or motion notifications and the ambient data 168 from the security device 102. The network-connected device 120 may include the location setting 106 and the linger duration 166 within the motion detection settings 526. When the location setting 106 indicates "apartment mode," the network-connected device 120 may invoke the motion analyzer 520 to determine whether the sensor data 156 includes an indication of a lingering presence at the apartment door 110. Similarly, based at least in part upon the light variation threshold 169, the network-connected device 120 may process the ambient data 168 to determine whether the location setting 106 should be set to the apartment mode, and thereby automatically configure the motion detection settings 526. Optionally, at least part of the motion detection settings 526 may be sent to configure the security device 102.

Figure 1G:
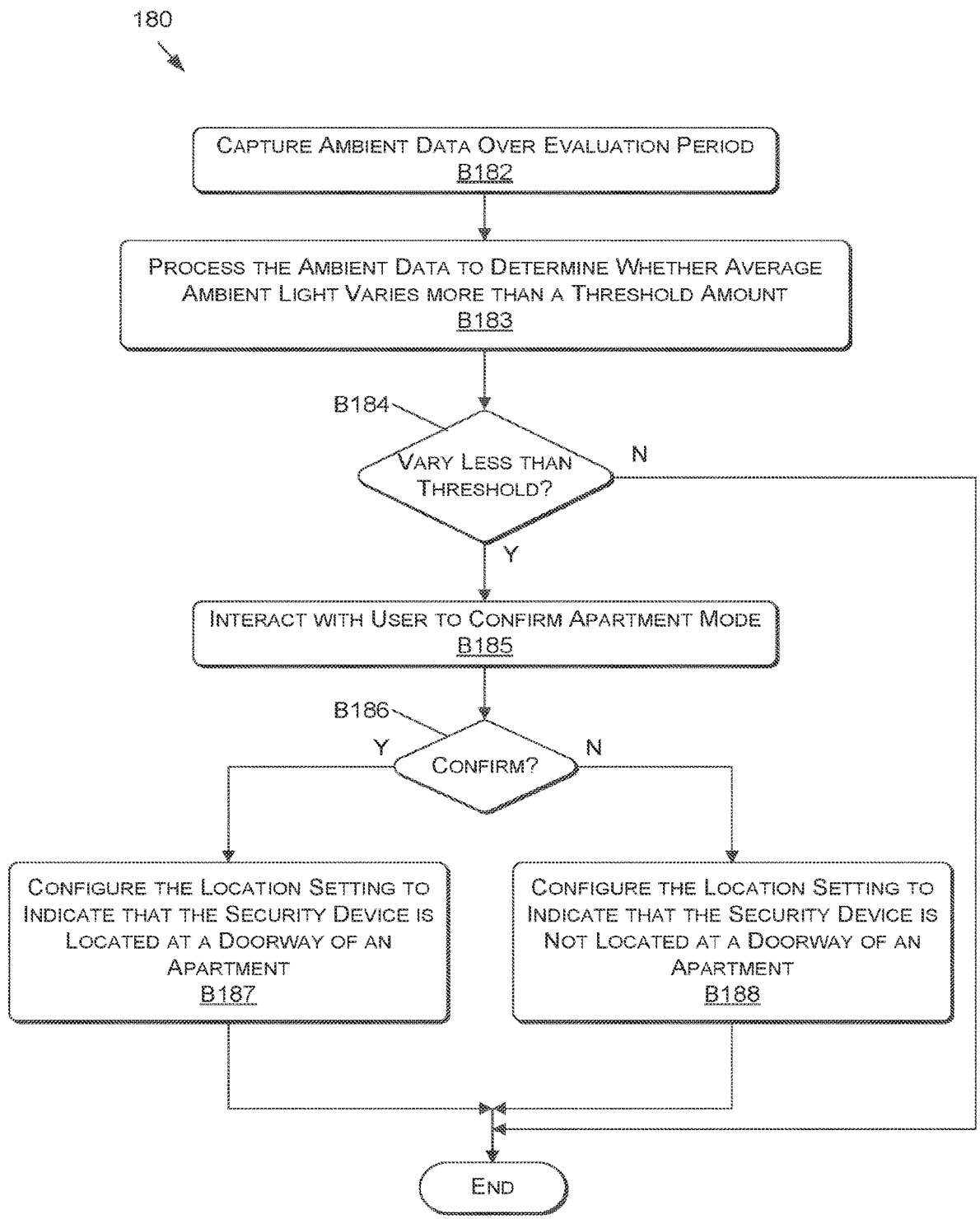
FIG. 1G is a flowchart illustrating one example process for automatically configuring motion detection settings of a security device, according to various aspects of the present disclosure.

FIG. 1G is a flowchart illustrating one example process 180 for automatically configuring the motion detection settings 104 of a security device, according to various aspects of the present disclosure. The process 180 may be implemented within one or more of the location detector 152 of the security device 102, the location detector 622 of the client device 124 (see FIG. 6), and/or within the location detector 522 (see FIG. 5) of the network-connected device 120, for example.

The process 180, in block B182, captures ambient data over an evaluation period. For example, where the evaluation period is one day, at various intervals (e.g., one of each hour, each 30 minutes, each 5 minutes, etc.) throughout the day, the location detector 152 uses the camera 148 (or a light sensor where implemented) to detect a level of light at the security device 102. In certain embodiments, the location detector 152 may average multiple light level values to determine an average light level for each interval. The location detector 152 may store the light level, or an average of the light level, as the ambient data 168 within the memory 144. The location detector 152 may further account for light level changes anticipated by known daylight hours; it may further account for lights turned either on or off (e.g., at the common access area 112) when switched on or off inside by timers or individuals.

The process 180, in block B183, processes the ambient data to determine whether average ambient light varies more than a threshold amount. For example, the location detector 152 may process the ambient data 168 to determine a difference between a maximum and a minimum average ambient light level corresponding to the evaluation period, and compares this difference to the light variation threshold 169. In another example of block B183, the location detector 152 sends the ambient data 168 to the network-connected device 120, where the location detector 522 processes it to determine a difference between a maximum and a minimum average ambient light level, and compares this difference to the light variation threshold 169. When the light level varies less than the threshold, in block B184, the process 180 decides to continue with block B185; otherwise the process 180 terminates until invoked again.

The process 180, in block B185 interacts with the user to confirm apartment mode. For example, via the network-connected device 120 and/or the network 122, the location detector 152 may interact with the client device 124 to display the interactive screen 174 (FIG. 1D) on the display 126, to allow the user (e.g., the owner) to confirm the apartment door configuration. The process 180, in block B186, decides to continue with block B187 when the user confirms the apartment mode configuration (e.g., when the owner selects the yes button 176); otherwise, the process 180 continues with block B188, as shown.

The process 180, in block B187, configures the location setting to indicate that the security device is located at a doorway of an apartment. For example, the location detector 152 sets the location setting 106 to apartment mode. In another example of block B187, the location detector 522 sets the location setting 106 to apartment mode and may send the motion detection settings 526 to the security device 102. The process 180 then terminates until invoked again.

The process 180, in block B188, configures the location setting to indicate that the security device is not located at a doorway of an apartment. For example, the location detector 152 sets the location setting 106 to "yard mode". In another example, the location detector 522 sets the location setting 106 to yard mode and may send the motion detection settings 526 to the security device 102. The process 180 then terminates until invoked again.

Figure 1H:
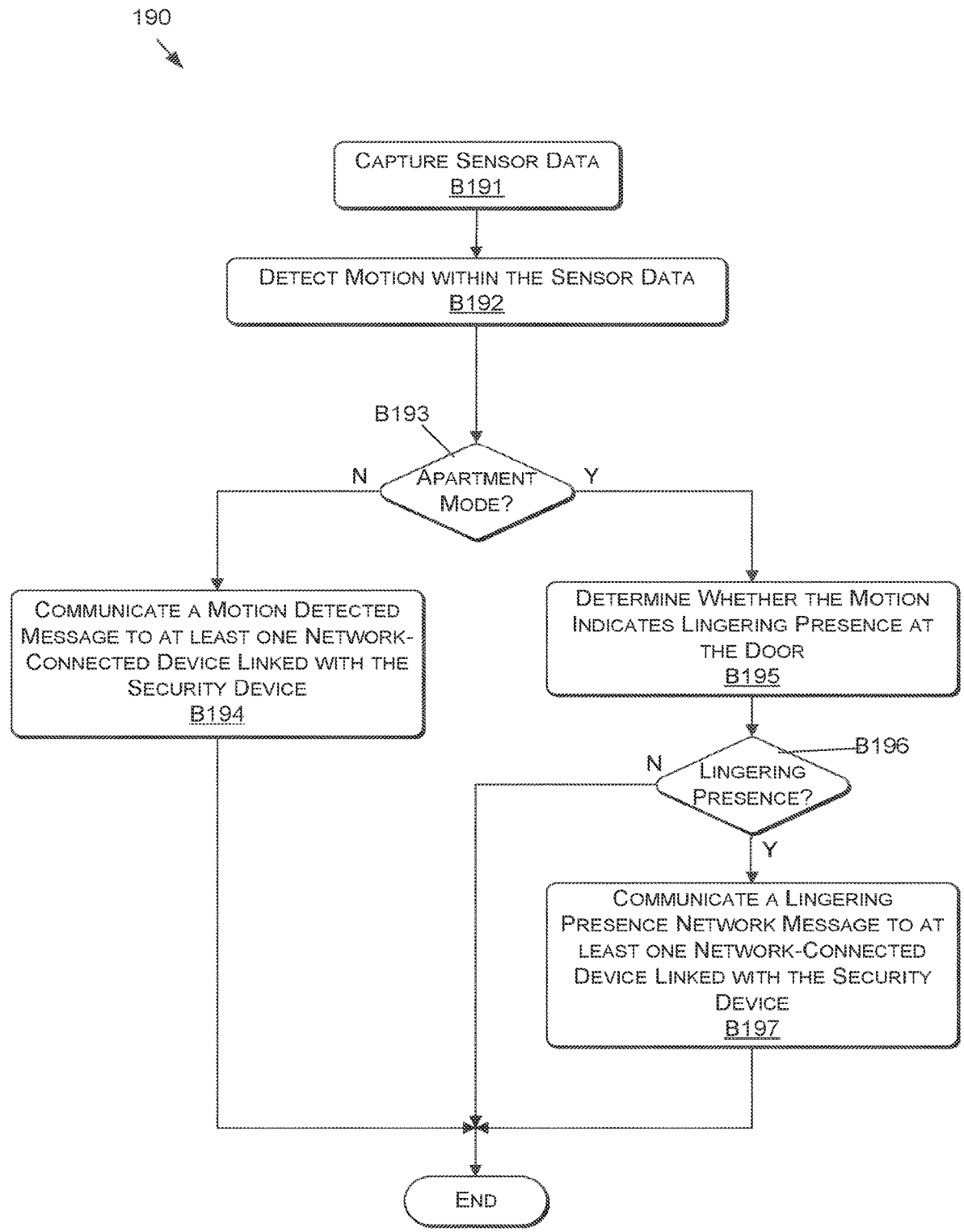
FIG. 1H is a flowchart illustrating one example process for detecting motion at an apartment door, based upon user-configurable motion detection settings, according to various aspects of the present disclosure.

FIG. 1H is a flowchart illustrating one example process 190 for detecting motion at an apartment door, based upon user-configurable motion detection settings, according to various aspects of the present disclosure. The process 190 may be implemented within the device application 146 of the security device 102, for example.

The process 190, in block B191, captures sensor data. In one example of block B191, the motion sensors 103 (one or more of the camera 148, the microphone 149, and the PIR sensors 150) capture sensor data 156 (one or more of image data 158, sound data 160, and heat data 162, respectively) when motion is detected within the common access area 112 about the security device 102. The process 190, in block B192, detects motion within the sensor data. In one example of block B192, the motion detector 109 may process one or both of the image data 158 and/or the sound data 160 to detect motion near the apartment door 110. In another example of block B192, the heat data 162 may indicate motion detected by the PLR sensors 150.

The process 190, in block B193, determines when the security device is configured in apartment mode and proceeds with block B195; otherwise the process 190 proceeds with block B194. In one example of block B193, the device application 146 may evaluate the location setting 106, proceeding with block B195 when the location setting 106 is set to "apartment mode," and alternatively proceed with block B194 when the location setting 106 is not set to "apartment mode."

The process 190, in block B194, communicates a motion detected message to at least one network-connected device linked with the security device. In one example of block B194, the device application 146 may generate the motion message 105 and send it to the network-connected device 120 via the network 122. The process 190 then terminates until invoked again.

The process 190, in block B195, determines whether the motion indicates lingering presence at the door. In one example of block B195, the device application 146 may invoke the motion analyzer 108 to process the sensor data 156 to determine whether there is a lingering presence at the apartment door 110. At block B196, when the lingering presence is detected, the process 190 continues with block B197; otherwise, the process 190 terminates until invoked again.

The process 190, in block B197, communicates a lingering presence network message to at least one network-connected device linked with the security device. In one example of block B197, the motion analyzer 108 may generate the lingering presence network message 107 and send it to the network-connected device 120, which in turn sends the notification 133 to the client device 124 to indicate the lingering presence at the apartment door 110.

Figure 2:
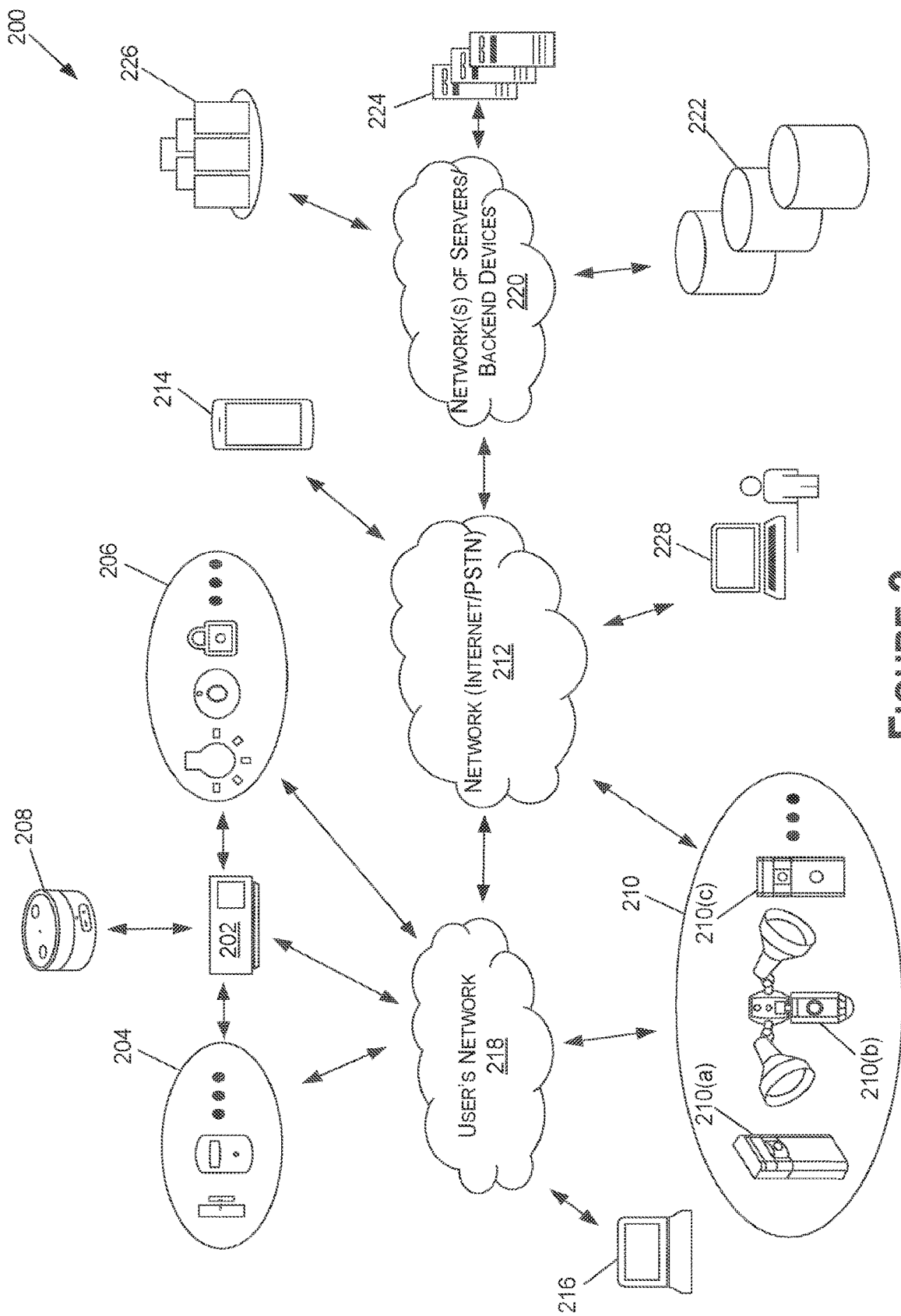
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network-connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

In embodiments, the security device 102 of FIGS. 1A and 1B may include similar components and functionality as the A/V recording and communication devices 210, FIG. 2. The network 122 of FIG. 1A a may include similar components and functionality as the network 218 and/or 212 and/or 220, FIG. 2. The network-connected device 120 may include similar components and functionality as the device 202 and/or 222 and/or 224 and/or 226 of FIG. 2. And the client device 124 may include similar components and functionality as the client device 214 and/or 216 of FIG. 2.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoW PAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may represent, and/or be similar to, the security device 102 of FIGS. 1A and 1B). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 124 of FIGS. 1A, 1C and 1D). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The network-connected device 120 of FIG. 1 may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
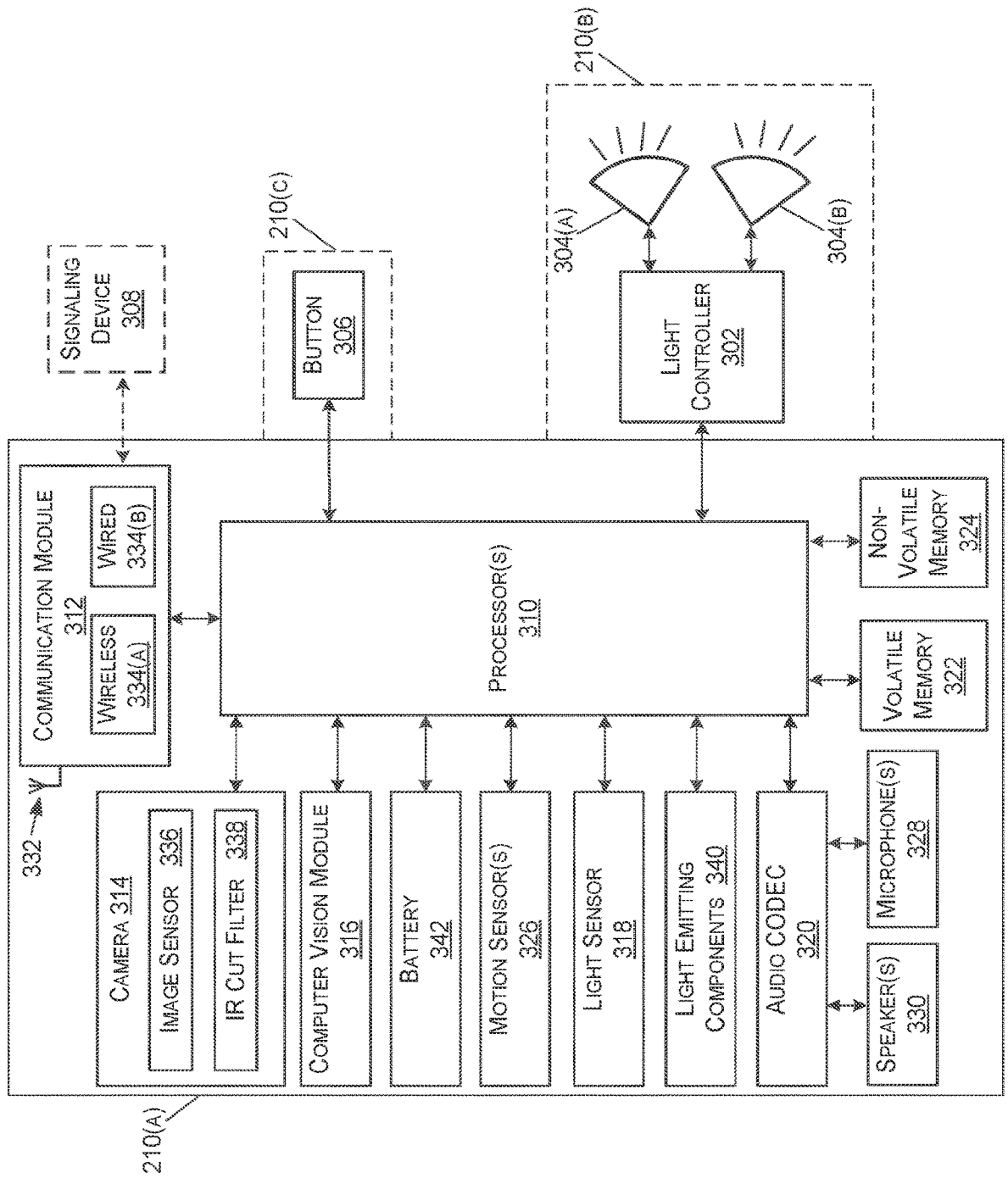
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(*a*) and wired 334(*b*) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(*c*) is pressed, the communication module 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722*p*, 1800*p*, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are. Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(*a*), 304(*b*) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(*a*), 304(*b*). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
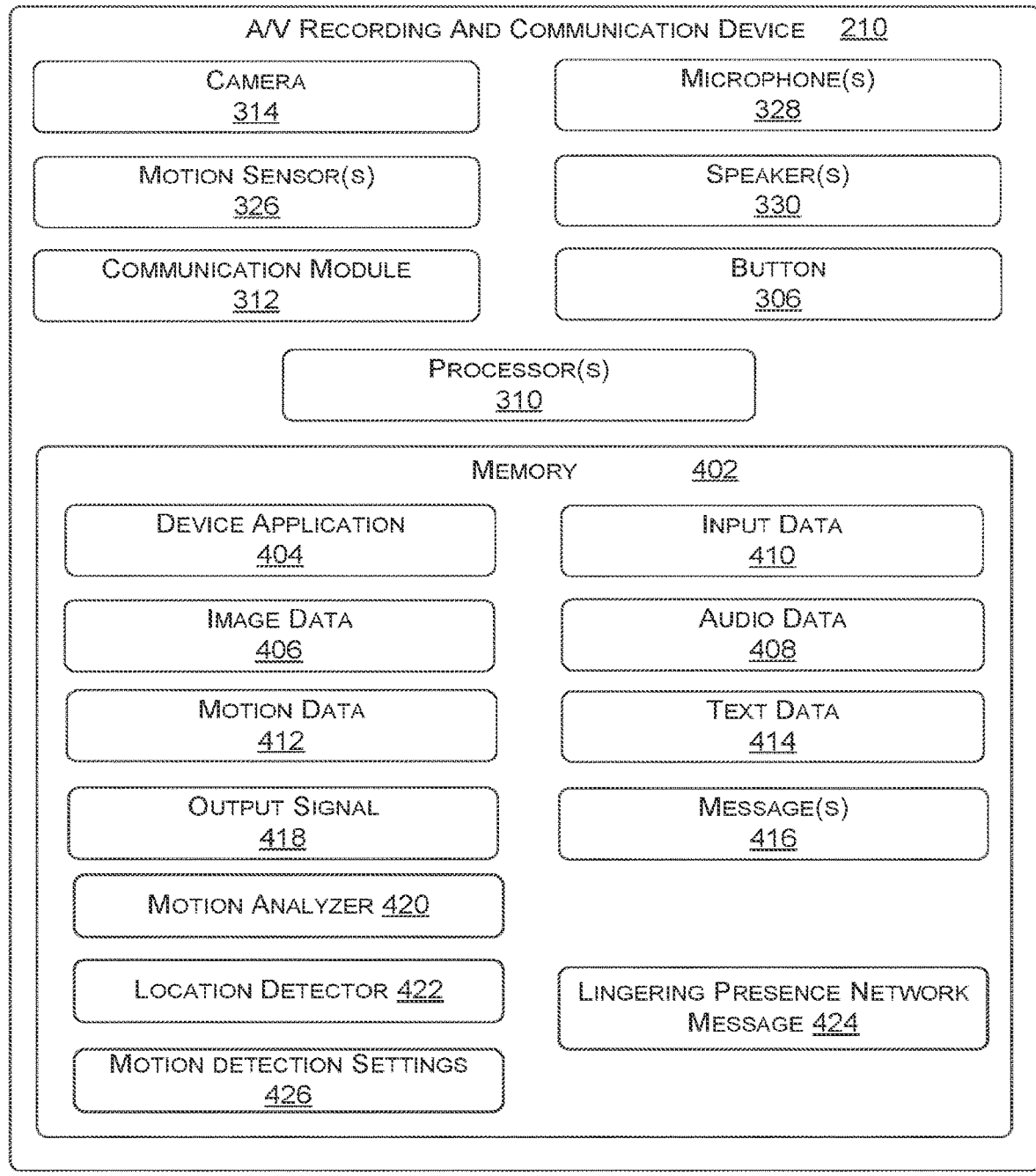
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210.

As shown in FIG. 4, the A/V device 210 may include a motion analyzer 420 and a location detector 422 that may be similar to the motion analyzer 108 and the location detector 152 of FIGS. 1A and 1B. The A/V device 210 may also include motion detection settings 426 that may correspond to the motion detection settings 104 of FIGS. 1A and 1B. In certain embodiments, the motion analyzer 420 and/or the location detector 422 may be part of the device application 404. The motion data 412 may correspond to the sensor data 156 of FIG. 1B, and may be analyzed by the motion analyzer 420, based at least in part upon the motion detection setting 426, to determine a lingering presence and generate a lingering presence network message 424, which may correspond to the lingering presence network message 107 of FIGS. 1A and 1B. Accordingly, the A/V device 210 may include similar functionality to the security device 102 of FIGS. 1A and 1B.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 210.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224. In certain embodiments, certain functionality of the security device 102 of FIGS. 1A and 1B may be performed, at least in part, within the backend server 224. As shown in FIG. 5, the backend server 224 may include a motion analyzer 520 and a location detector 522 that may be similar to the motion analyzer 108 and the location detector 152 of FIGS. 1A and 1B. The backend server 224 may also include motion detection settings 526 that may be similar to the motion detection settings 104 of FIGS. 1A and 1B. In certain embodiments, the motion analyzer 520 and/or the location detector 522 may be part of the server application 508. The backend server 224 may receive the sensor data 156 from the security device 102, and the motion analyzer 520 may analyze the sensor data 156, based at least in part upon the motion detection setting 526, to determine a lingering presence and generate a lingering presence network message 524, which may be similar to the lingering presence network message 107 of FIGS. 1A and 1B. The backend server 224 may also receive the ambient data 168 from the security device 102 and the location detector 522 may process the ambient data 168 to determine whether the security device 102 should be configured in apartment mode, setting the motion detection settings 528/104 accordingly. Thus, in certain embodiments, the backend server 224 may include similar functionality to the security device 102 of FIGS. 1A and 1B.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the backend server 224, in some embodiments, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the backend server 224 (and/or one or more additional or alternative components of the network(s) of servers/backend devices 220) may alternatively be referred to herein as "network devices."

Figure 6:
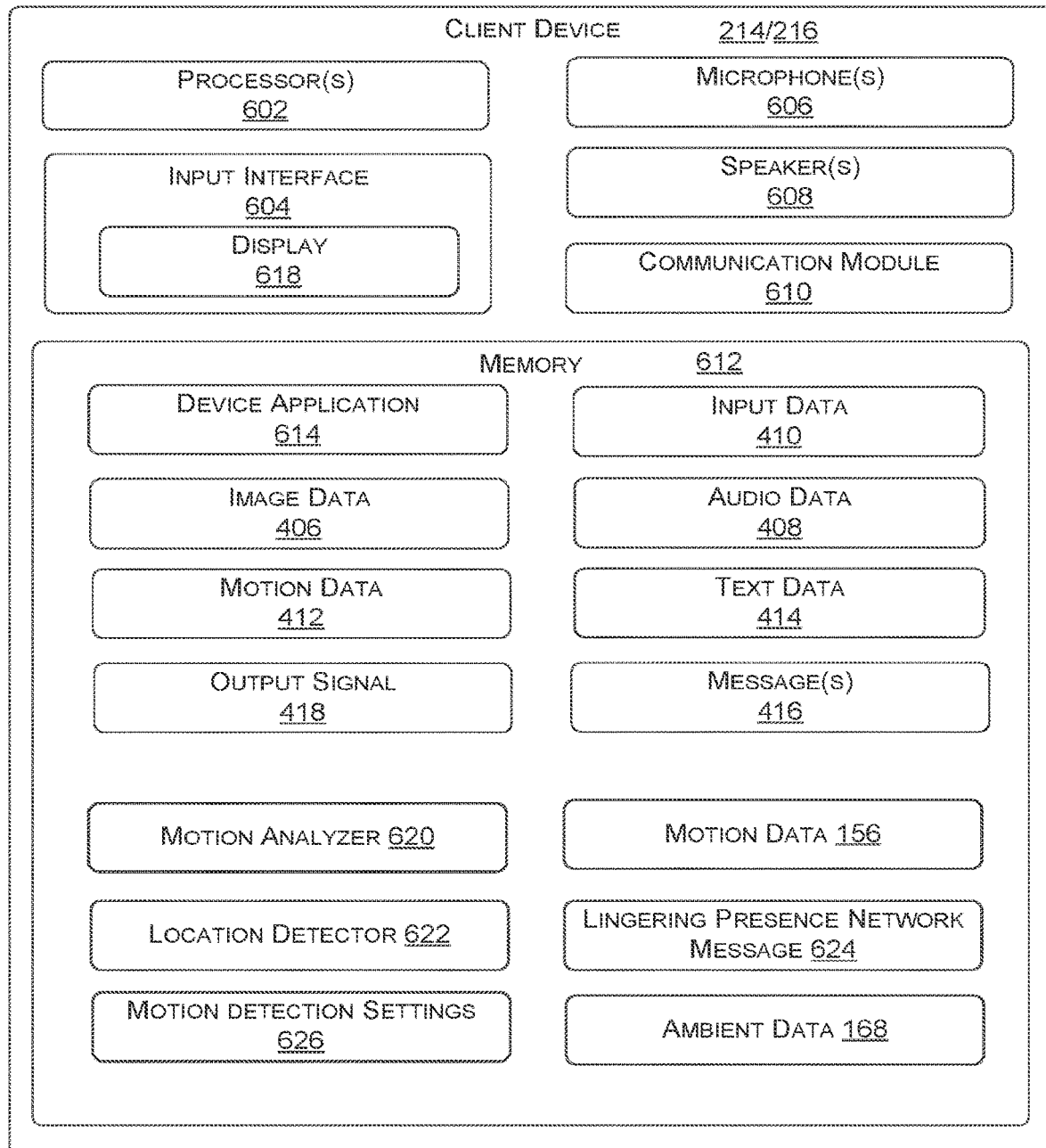
FIG. 6 is a functional block diagram illustrating one example embodiment of a client device according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., the notification 133 of FIG. 1A). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., the user response to the interactive screen 174 of FIG. 1D). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216.

In certain embodiments, certain functionality of the security device 102 of FIGS. 1A and 1B may be performed, at least in part, within the client device 214/216. As shown in FIG. 6, the client device 214/216 may include a motion analyzer 620 and a location detector 622 that may be similar to the motion analyzer 108 and the location detector 152 of FIGS. 1A and 1B. The client device 214/216 may also include motion detection settings 626 that may correspond to the motion detection settings 104 of FIGS. 1A and 1B. In certain embodiments, the motion analyzer 620 and/or the location detector 622 may be part of the device application 614. The backend server 224 may receive the sensor data 156 from the security device 102, and the motion analyzer 420 may analyze the sensor data 156, based at least in part upon the motion detection setting 626, to determine a lingering presence and generate a lingering presence network message 624, which may be similar to the lingering presence network message 107 of FIGS. 1A and 1B. Similarly, the client device 214/216 may receive the ambient data 168 from the security device 102 and the location detector 622 may process the ambient data 168 to determine whether the security device 102 should be configured in apartment mode, setting the motion detection settings 628/104 accordingly. Thus, in certain embodiments, the client device 214/216 may include similar functionality to the security device 102 of FIGS. 1A and 1B.

Figure 7:
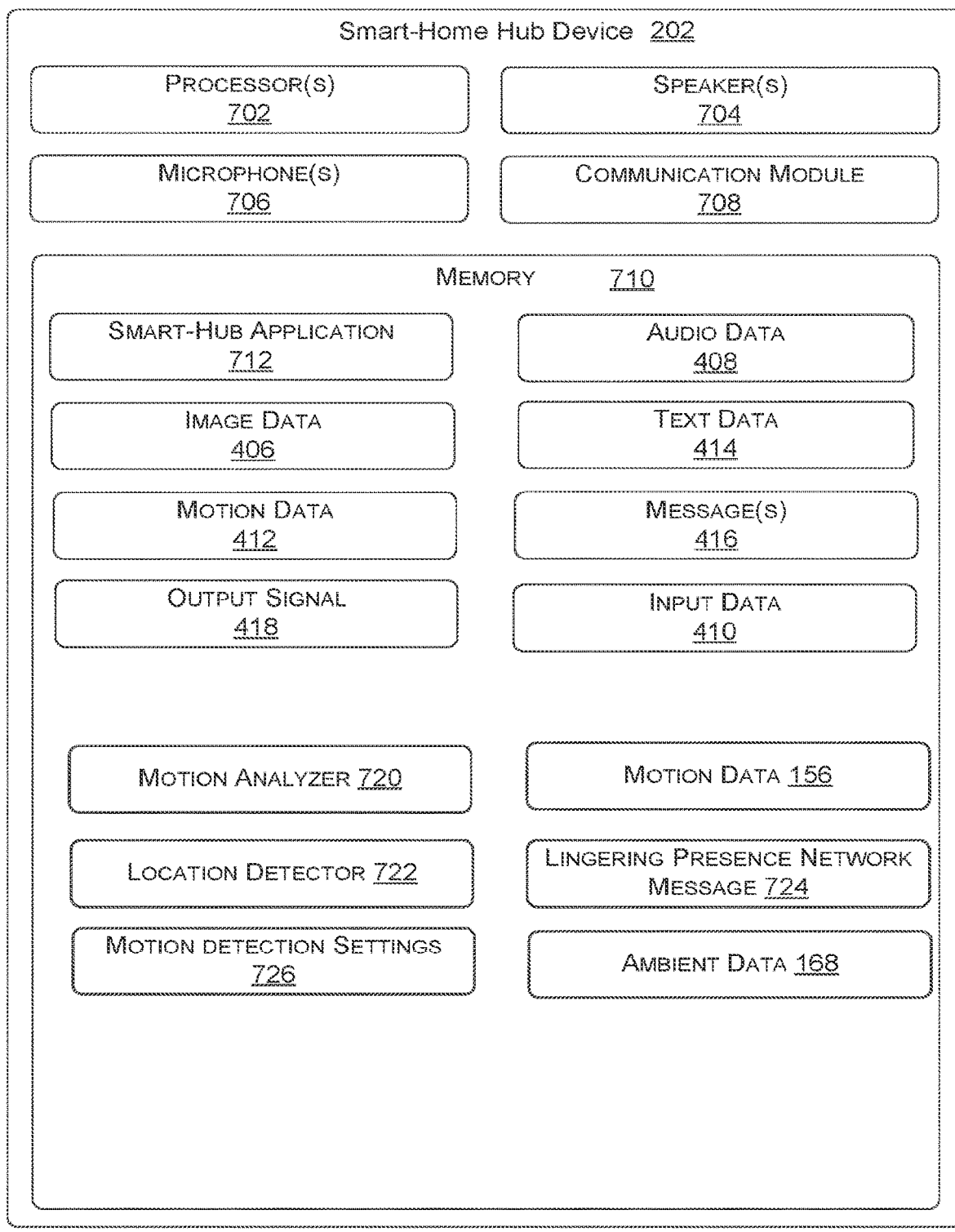
FIG. 7 is a functional block diagram illustrating one example embodiment of a smart-home hub device according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more of a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the backend server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the backend server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the backend server 224, and/or an additional electronic device (e.g., a second A/V device 210, the automation device(s) 206, the sensor(s) 204, etc.).

As described herein, at least some of the processes of the A/V device 210, the backend server 224, and/or the client device 214, 216 may be executed by the hub device 202.

In certain embodiments, certain functionality of the security device 102 of FIGS. 1A and 1B may be performed, at least in part, within the smart-home hub device 202. As shown in FIG. 7, the smart-home hub device 202 may include a motion analyzer 720 and a location detector 722 that may be similar to the motion analyzer 108 and the location detector 152 of FIGS. 1A and 1B. The smart-home hub device 202 may also include motion detection settings 726 that may correspond to the motion detection settings 104 of FIGS. 1A and 1B. In certain embodiments, the motion analyzer 720 and/or the location detector 722 may be part of the smart-hub application 712. The smart-home hub device 202 may receive the sensor data 156 from the security device 102, and the motion analyzer 720 may analyze the sensor data 156, based at least in part upon the motion detection setting 726, to determine a lingering presence and generate a lingering presence network message 724, which may be similar to the lingering presence network message 107 of FIGS. 1A and 1B. Similarly, the smart-home hub device 202 may receive the ambient data 168 from the security device 102 and the location detector 722 may process the ambient data 168 to determine whether the security device 102 should be configured in apartment mode, setting the motion detection settings 728/104 accordingly. Thus, in certain embodiments, the smart-home hub device 202 may include similar functionality to the security device 102 of FIGS. 1A and 1B.

Each of the processes described herein, including the processes 180, and 190, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

One aspect of the present embodiments includes the realization that the security device 102 may be positioned near the common access area 112, through which persons 114, 118 pass and may or may not need attention. For example, where the security device 102 is positioned at the apartment door 110 that opens onto a corridor (e.g., the common access area 112), the security device 102 may detect movement in the corridor of the person 114 passing the apartment door 110 and that does not need attention. Similarly, the security device 102 may be positioned at a door of a condo or townhome that faces a shared stairway (e.g., the common access area 112), where some people using the shared stairway do not need attention. Similarly, the security device may be positioned at a door facing a sidewalk or path (e.g., the common access area 112), where some people using the path do not need attention. Similarly again, the security device 102 may be positioned at an office door that opens onto a corridor (e.g., the common access area 112), where people using the corridor do not need attention of the office.

When the security device 102 is positioned near the common access area 112 (e.g., one of the corridor, the shared stairway, the shared pathway, etc.), the security device 102 may detect motion of the person 114 passing through the common access area 112 but not needing attention (e.g., a person having no intent of using the apartment door 110 near the security device 102). Accordingly, the owner may be notified of the detected motion when the person does not require attention and deem the notification a "false alarm." The greater the use of the common access area 112, the greater the number of false alarms generated, making use of motion detection at such locations impractical for indicating when a person needs attention. The present embodiments solve this problem by including a configuration setting (e.g., location setting 106), within the security device 102 or linked server (e.g., network-connected device 120), for example, that may be set to indicate when the security device 102 is positioned near the common access area 112. When the location setting 106 indicates that the security device 102 is near the common access area 112, the security device 102 may inhibit notification 133 to the owner when motion is detected, but may process sensor data 156 captured by the security device 102 to determine when there is a lingering presence (e.g., of a person 118 waiting at the apartment door 110), and may send a notification 133 indicating the lingering presence to the owner.

Advantageously, when configured as being near the common access area 112, the security device 102 does not generate notifications for persons passing, but does generate notifications when persons are waiting, pacing or lingering. Because the security device 102 is configurable, that same security device 102 may advantageously be used near the common access areas 112 (e.g., at an apartment door facing a corridor) and may be used in other situations when notification of any detected motion is desirable. Accordingly, the configurable security device 102 is more useful and more versatile than a non-configurable device.

Another aspect of the present embodiments includes the realization that a user may configure the security device 102 incorrectly, resulting in many false notifications when the security device 102 is near to the common access area 112. The present embodiments solve this problem by automatically determining when the security device 102 is positioned near the common access area 112, based upon one or more sensed conditions, such as ambient light conditions about the security device 102, where certain sensed conditions are indicative of the security device 102 being near the common access area 112. Advantageously, by automatically detecting when the security device 102 is near the common access area 112, the security device 102 (and/or the network-connected device 120) may prompt the user (e.g., using the client device 124) to set the configuration (e.g., the location setting 106) for operation of the security device 102 near the common access area 112, and/or may automatically set the configuration accordingly. Advantageously, such automatic detection and/or configuration of the security device 102 for use near the common access area 112, thereby preventing the user from becoming dissatisfied with the security device 102 by avoiding many false alarms.

In a first aspect, a security device includes at least one camera configured to capture sequential frames of image data within a field of view, at least one processor, memory communicatively coupled with the processor(s), a location setting, stored in the memory, defining whether or not the security device is located at a common access area, and machine readable instructions stored in the memory. The machine readable instructions are executable by the processor(s) to: determine the image data indicates motion, and determine that the motion indicates lingering presence at the common access area.

In certain embodiments of the first aspect, the machine readable instructions further include machine readable instructions executable by the processor(s) to communicate a lingering presence network message to at least one network-connected device linked with the security device when the motion indicates the lingering presence at the common access area.

In certain embodiments of the first aspect, the machine readable instructions further include machine readable instructions executable by the processor(s) to configure the location setting by receiving, from at least one network-connected device, information indicating that the security device is located at the apartment door. The location setting is configured based at least in part upon the information.

In certain embodiments of the first aspect, the machine readable instructions further include machine readable instructions executable by the processor(s) to determine, from the image data, that the average ambient light over a daily period varies less than a light variation threshold, and configure the location setting to indicate that the security device is located at the common access area.

In certain embodiments of the first aspect, the at least one camera, when installed in a door, has a line of sight for the field of view extending perpendicularly away from the door and through an aperture in the door.

Certain embodiments of the first aspect further include a housing that fits within the aperture and at least partially surrounds the at least one camera.

In certain embodiments of the first aspect, the housing is cylindrical, such that the security device is operable as a peephole camera.

Certain embodiments of the first aspect further include machine readable instructions executable by the processor(s) to determine that the captured sequential frames of image data indicate movement of a human, and determine that back-and-forth movement of the human represents the lingering presence at the common access area.

Certain embodiments of the first aspect further include a doorbell.

In a second aspect, a security device has user-configurable motion detection settings, and includes at least a first infrared sensor having a first field of view and a second infrared sensor having a second field of view, at least one processor, memory communicatively coupled with the processor(s), a location setting, stored in the memory, defining whether or not the security device is located at a common access area, and machine readable instructions stored in the memory and executable by the processor(s) to determine, based at least in part upon the location setting and the user-configurable motion settings, that heat data detected by at least one of the first and second infrared sensors indicates a lingering presence in at least one of the first and second fields of view.

In certain embodiments of the second aspect, the machine readable instructions further include machine readable instructions executable by the processor(s) to send a lingering presence network message when the heat data indicates the lingering presence in at least one of the fields of view, and when the location setting indicates that the security device is located at the common access area.

In certain embodiments of the second aspect, the machine readable instructions further include machine readable instructions configured to determine that the heat data indicates the lingering presence when the first and second infrared sensors alternatingly capture the heat data from the first and second fields of view.

In certain embodiments of the second aspect, the first and second fields of view are partially overlapping.

Certain embodiments of the second aspect further include at least one camera configured to capture sequential frames of image data within a camera field of view. The machine readable instructions further include machine readable instructions executable by the processor(s) to determine, from the at least one camera, that average ambient light in the camera field of view, over an evaluation period, varies less than a light variation threshold, and configure the location setting to indicate that the security device is located at the common access area.

In certain embodiments of the second aspect, the machine readable instructions further include machine readable instructions executable by the processor(s) to: send a query to a network-connected device to confirm that the security device is located at the common access area, and receive, from the network-connected device, a response indicating that the security device is located at the common access area. The location setting being based at least in part upon the response.

In certain embodiments of the second aspect, the machine readable instructions further include machine readable instructions executable by the processor(s) to determine that the heat data indicates movement of a human, and determine that the human remains within at least one of the fields of view for at least a predefined duration.

In certain embodiments of the second aspect, the machine readable instructions further include machine readable instructions executable by the processor(s) to determine that the heat data indicates movement of a human and determine that back-and-forth movement of the human indicates the lingering presence in at least one of the first and second fields of view.

In certain embodiments of the second aspect, the security device is a doorbell security device.

In certain embodiments of the second aspect, the first and second infrared sensors are pyroelectric infrared sensors.

In a third aspect, a security device includes at least one microphone configured to capture sound data from a common access area about the security device, at least one processor, and memory storing machine readable instructions executable by the processor(s) to implement algorithms to determine that the sound data includes footsteps and repetitive shuffling indicating back-and-forth movement of a human, and determine that at least one of the footsteps and the repetitive shuffling sound indicates lingering presence of the human in the common access area.

In certain embodiments of the third aspect, the machine readable instructions further include machine readable instructions executable by the processor(s) to communicate a lingering presence network message to at least one network-connected device linked with the security device when the sound data indicates lingering presence of the human in the common access area.

Certain embodiments of the third aspect further include at least one camera configured to capture sequential frames of image data within a camera field of view. The machine readable instructions further including machine readable instructions executable by the processor(s) to: determine, from the image data, that the average ambient light over a daily period varies less than a light variation threshold, and configure a location setting, stored in the memory, to indicate that the security device is located at a common access area.

In certain embodiments of the third aspect, the machine readable instructions further include machine readable instructions executable by the processor(s) to configure the location setting by: receiving, from at least one network-connected device, information indicating that the security device is located at the common access area, and configuring the location setting based at least in part upon the information.

In certain embodiments of the third aspect, the microphone(s), when installed at a door, capture audio from in front of the door.

Certain embodiments of the third aspect further include a doorbell.

In a fourth aspect, a cyclical motion filtering security system, includes at least one of a camera configured to capture sequential frames of image data within a field of view and at least a first infrared sensor having a first field of view and a second infrared sensor having a second field of view, the first and second infrared sensors configured to capture heat data from the first and second fields of view, and a microphone configured to capture sound data about the security system. The cyclical motion filtering security system also includes at least one processor, and memory storing machine readable instructions executable by the processor(s) to determine that cyclical movement exists in one or more of the image data, the heat data, and the sound data, and determine that the cyclical movement represents pacing in a common access area.

In certain embodiments of the fourth aspect, the machine readable instructions further include machine readable instructions executable by the processor(s) to communicate a cyclical movement network message to at least one network-connected device linked with the security system when cyclical movement exists.

In certain embodiments of the fourth aspect, the camera, when installed in a door, has a line of sight for the field of view extending perpendicularly away from the door and through an aperture of the door.

In certain embodiments of the fourth aspect, the microphone(s), when installed in a door, capture sound in front of the door.

In certain embodiments of the fourth aspect, the machine readable instructions further include machine readable instructions executable by the processor(s) to: determine that one or more of the captured video, the captured heat data, and the sound data includes cyclical movement of a human, and determine that the cyclical movement comprises back-and-forth movement of a human.

In certain embodiments of the fourth aspect, the machine readable instructions further include machine readable instructions executable by the processor(s) to determine that the sound data indicates footsteps of the human.

Certain embodiments of the fourth aspect further include a doorbell.

Figure 8:
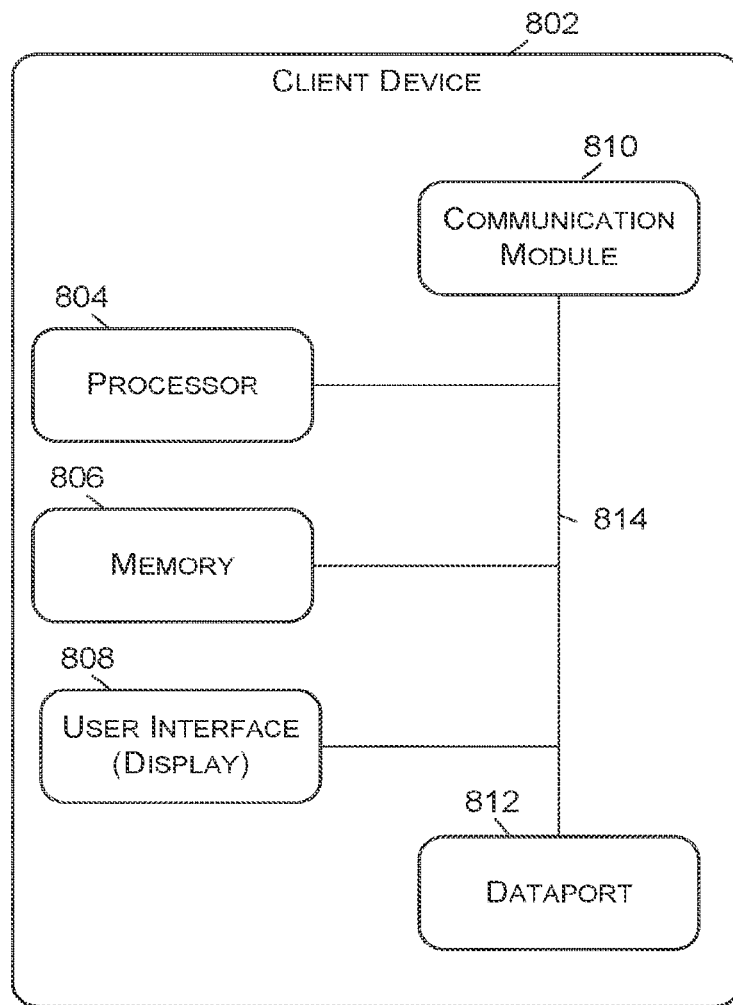
FIG. 8 is a functional block diagram of a client device on which the present embodiments may be implemented according to various aspects of the present disclosure.

FIG. 8 is a functional block diagram of a client device 802 on which the present embodiments may be implemented according to various aspects of the present disclosure. The client device(s) 214, 216 described with reference to FIG. 2 may include some or all of the components and/or functionality of the client device 802. The client device 802 may comprise, for example, a smartphone.

With reference to FIG. 8, the client device 802 includes a processor 804, a memory 806, a user interface 808, a communication module 810, and a dataport 812. These components are communicatively coupled together by an interconnect bus 814. The processor 804 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 806 may include both operating memory, such as random-access memory (RAM), as well as data storage, such as read-only memory (ROM), hard drives, flash memory, or any other suitable memory/storage element. The memory 806 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 804 and the memory 806 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 804 may be connected to the memory 806 via the dataport 812.

The user interface 808 may include any user interface or presentation elements suitable for a smartphone and/or a portable computing device, such as a keypad, a display screen, a touchscreen, a microphone, and a speaker. The communication module 810 is configured to handle communication links between the client device 802 and other, external devices or receivers, and to route incoming/outgoing data appropriately. For example, inbound data from the dataport 812 may be routed through the communication module 810 before being directed to the processor 804, and outbound data from the processor 804 may be routed through the communication module 810 before being directed to the dataport 812. The communication module 810 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 812 may be any type of connector used for physically interfacing with a smartphone and/or a portable computing device, such as a mini-USB port or an IPHONE®/IPOD® 30-pin connector or LIGHTNING® connector. In other embodiments, the dataport 812 may include multiple communication channels for simultaneous communication with, for example, other processors, servers, and/or client terminals.

The memory 806 may store instructions for communicating with other systems, such as a computer. The memory 806 may store, for example, a program (e.g., computer program code) adapted to direct the processor 804 in accordance with the present embodiments. The instructions also may include program elements, such as an operating system. While execution of sequences of instructions in the program causes the processor 804 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 9:
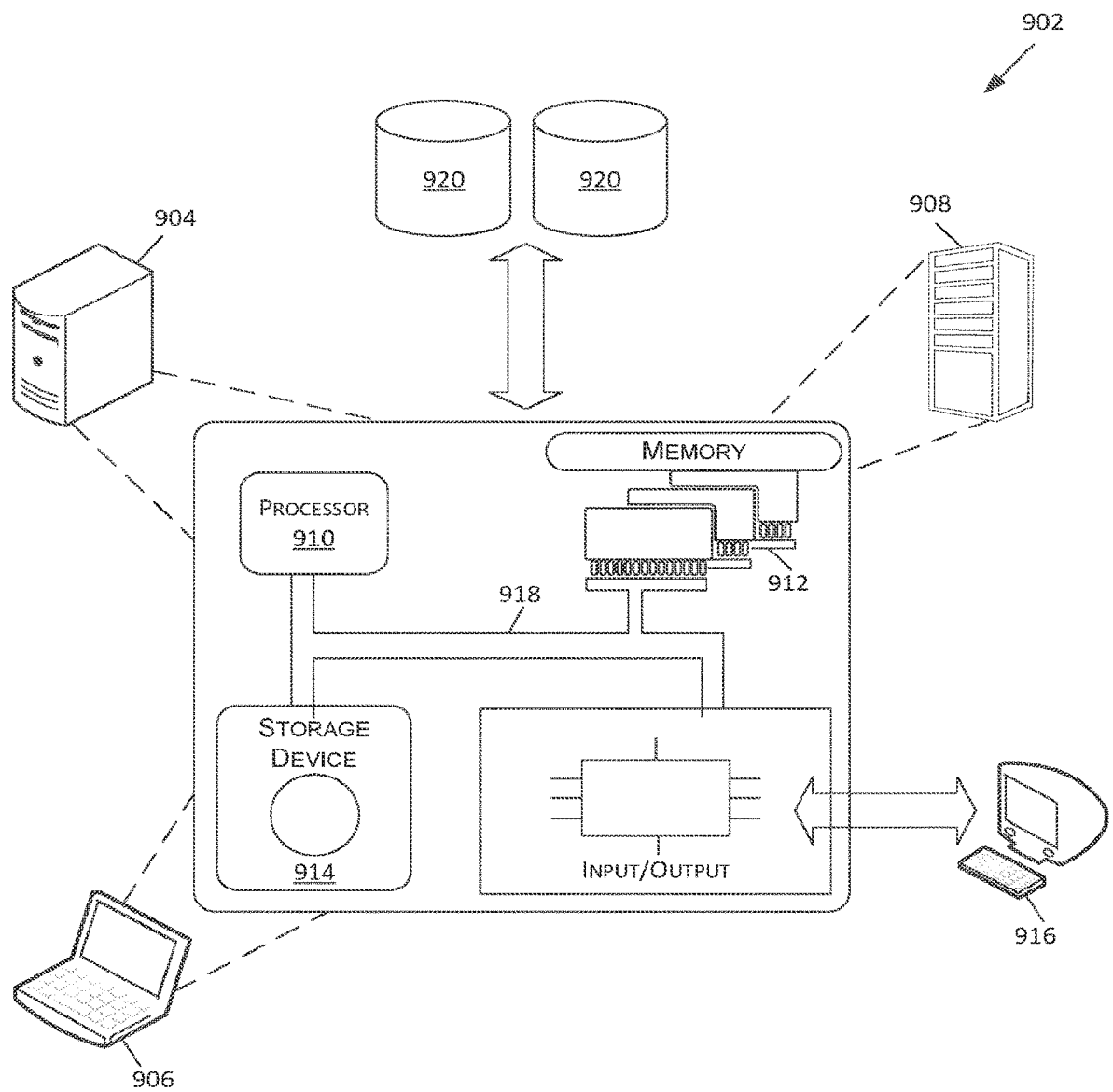
FIG. 9 is a functional block diagram of a general-purpose computing system on which the present embodiments may be implemented according to various aspects of present disclosure.

FIG. 9 is a functional block diagram of a general-purpose computing system on which the present embodiments may be implemented according to various aspects of the present disclosure. The computer system 902 may be embodied in at least one of a personal computer (also referred to as a desktop computer) 904, a portable computer (also referred to as a laptop or notebook computer) 906, and/or a server 908 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 902 may execute at least some of the operations described above. The computer system 902 may include at least one processor 910, memory 912, at least one storage device 914, and input/output (I/O) devices 916. Some or all of the components 910, 9 12, 914, 916 may be interconnected via a system bus 918. The processor 910 may be single- or multi-threaded and may have one or more cores. The processor 910 execute instructions, such as those stored in the memory 912 and/or in the storage device 914. Information may be received and output using one or more I/O devices 916.

The memory 912 may store information, and may be a computer-readable medium, such as volatile or non-volatile memory. The storage device(s) 914 may provide storage for the system 902 and, in some embodiments, may be a computer-readable medium. In various aspects, the storage device(s) 914 may be a flash memory device, a hard disk device, an optical disk device, a tape device, or any other type of storage device.

The I/O devices 916 may provide input/output operations for the system 902. The I/O devices 916 may include a keyboard, a pointing device, and/or a microphone. The I/O devices 916 may further include a display unit for displaying graphical user interfaces, a speaker, and/or a printer. External data may be stored in one or more accessible external databases 920.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An electronic device comprising:
   a camera;
   one or more processors; and
   one or more computer-readable media storing instructions that, when executed by the one or more processors, cause the electronic device to perform operations comprising:
   storing first configuration data indicating that the electronic device is located proximate to a common access area,
   generating first image data using the camera,
   determining that the first image data represents a first object for a first period of time,
   determining that the first period of time is less than a threshold period of time,
   based at least in part on the first configuration data and the determining that the first period of time is less than the threshold period of time, refraining from sending a first notification associated with the first object,
   generating second image data using the camera,
   determining that the second image data represents a second object for a second period of time,
   determining that the second period of time is greater than the threshold period of time,
   based at least in part on the first configuration data and the determining that the second period of time is greater than the threshold period of time, sending a second notification associated with the second object,
   storing second configuration data indicating that the electronic device is not located proximate to a common access area,
   generating third image data using the camera,
   determining that the third image data represents a third object, and
   based at least in part on the second configuration data and the determining that the third image data represents the third object, sending a third notification associated with the third object.

2. The electronic device of claim 1, wherein the one or more computer-readable media store instructions that, when executed by the one or more processors, cause the electronic device to perform operations comprising
   storing the first configuration data based on data received from a remote system indicating that the electronic device is located at a common access area.

3. The electronic device of claim 1, wherein the one or more computer-readable media store instructions that, when executed by the one or more processors, cause the electronic device to perform operations comprising
   storing the first configuration data based on data received from a remote system indicating that the electronic device is not located at a common access area.

4. The electronic device of claim 1, wherein the one or more computer-readable media store instructions that, when executed by the one or more processors, cause the electronic device to perform operations comprising
   determining, based on image data generated using the camera, an ambient light value;
   determining the first configuration data based on the ambient light value.

5. The electronic device of claim 1, wherein the determining that the second period of time is greater than the threshold period of time is based on a comparison of whether the second period of time is greater than or equal to the threshold period of time.

6. The electronic device of claim 1, wherein the third notification is sent without determining whether the third object was detected for the threshold period of time.

7. The electronic device of claim 1, wherein the third image data depicts the third object for less than the threshold period of time.

8. The electronic device of claim 1, wherein the determining that the first image data represents a first object for a first period of time comprises determining, for each respective frame of a plurality of consecutive frames, that an image region of the respective frame corresponds to the first object.

9. The electronic device of claim 1, wherein the determining that the first image data represents a first object for a first period of time comprises, for each of a plurality of frames,
   segmenting the first image data into a plurality of image regions, including one or more object regions; and
   determining that one of the object regions is an object region corresponding to the first object.

10. The electronic device of claim 1, wherein the operations further comprise:
    based on the location setting and based on determining that the motion indicates lingering presence at the common access area, sending a first notification.

11. An electronic device comprising:
    a camera;
    one or more processors; and
    one or more computer-readable media storing instructions that, when executed by the one or more processors, cause the electronic device to perform operations comprising:
    storing first configuration data indicating a first mode of operation,
    generating first image data using the camera, determining that the first image data represents a first object for a first period of time, determining that the first period of time is less than a threshold period of time, based at least in part on the first configuration data and the determining that the first period of time is less than the threshold period of time, refraining from sending a first notification associated with the first object, generating second image data using the camera, determining that the second image data represents a second object for a second period of time, determining that the second period of time is greater than the threshold period of time, based at least in part on the first configuration data and the determining that the second period of time is greater than the threshold period of time, sending a second notification associated with the second object, storing second configuration data indicating a second mode of operation, generating third image data using the camera, determining that the third image data represents a third object, and based at least in part on the second configuration data and the determining that the third image data represents the third object, sending a third notification associated with the third object.

12. The electronic device of claim 11, wherein the one or more computer-readable media store instructions that, when executed by the one or more processors, cause the electronic device to perform operations comprising storing the first configuration data based on data received from a remote system indicating that the electronic device is located at a common access area.

13. The electronic device of claim 11, wherein the one or more computer-readable media store instructions that, when executed by the one or more processors, cause the electronic device to perform operations comprising storing the first configuration data based on data received from a remote system indicating that the electronic device is not located at a common access area.

14. The electronic device of claim 11, wherein the one or more computer-readable media store instructions that, when executed by the one or more processors, cause the electronic device to perform operations comprising determining, based on image data generated using the camera, an ambient light value;

determining the first configuration data based on the ambient light value.

15. The electronic device of claim 11, wherein the determining that the second period of time is greater than the threshold period of time is based on a comparison of whether the second period of time is greater than or equal to the threshold period of time.

16. The electronic device of claim 11, wherein the third notification is sent without determining whether the third object was detected for the threshold period of time.

17. The electronic device of claim 11, wherein the third image data depicts the third object for less than the threshold period of time.

18. The electronic device of claim 11, wherein the determining that the first image data represents a first object for a first period of time comprises determining, for each respective frame of a plurality of consecutive frames, that an image region of the respective frame corresponds to the first object.

19. The electronic device of claim 11, wherein the determining that the first image data represents a first object for a first period of time comprises, for each of a plurality of frames, segmenting the first image data into a plurality of image regions, including one or more object regions; and determining that one of the object regions is an object region corresponding to the first object.

\* \* \* \* \*